(12) United States Patent
Igari

(10) Patent No.: US 10,513,102 B2
(45) Date of Patent: Dec. 24, 2019

(54) PEELING APPARATUS

(71) Applicant: Oki Data Corporation, Tokyo (JP)

(72) Inventor: Yoshifumi Igari, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/655,574

(22) Filed: Jul. 20, 2017

(65) Prior Publication Data

US 2018/0022077 A1  Jan. 25, 2018

(30) Foreign Application Priority Data

Jul. 21, 2016 (JP) ................. 2016-143072

(51) Int. Cl.
| | |
|---|---|
| *B32B 43/00* | (2006.01) |
| *B32B 38/10* | (2006.01) |
| *B65H 37/00* | (2006.01) |
| *B65H 18/02* | (2006.01) |
| *B65H 18/10* | (2006.01) |
| *B65H 18/08* | (2006.01) |
| *B65H 20/02* | (2006.01) |
| *B65H 41/00* | (2006.01) |
| *B31D 1/02* | (2006.01) |
| *B32B 37/00* | (2006.01) |

(52) U.S. Cl.
CPC ............ *B32B 38/10* (2013.01); *B32B 43/006* (2013.01); *B65H 18/026* (2013.01); *B65H 18/08* (2013.01); *B65H 18/10* (2013.01); *B65H 20/02* (2013.01); *B65H 37/002* (2013.01); *B65H 41/00* (2013.01); *B31D 1/021* (2013.01); *B32B 37/0053* (2013.01); *B65H 2301/51122* (2013.01); *B65H 2701/19404* (2013.01); *Y10T 156/1174* (2015.01); *Y10T 156/1195* (2015.01); *Y10T 156/195* (2015.01); *Y10T 156/1956* (2015.01); *Y10T 156/1994* (2015.01)

(58) Field of Classification Search
CPC . B32B 38/10; B32B 43/006; Y10T 156/1174; Y10T 156/1195; Y10T 156/195; Y10T 156/1956; Y10T 156/1994
USPC .......................... 156/715, 719, 759, 760, 767
See application file for complete search history.

(56) References Cited

U.S. PATENT DOCUMENTS

| | | | | |
|---|---|---|---|---|
| 2,325,400 A | * | 7/1943 | Hoover .............. | B65H 35/0026 156/767 |
| 4,165,251 A | * | 8/1979 | Matsumoto ............. | G03F 7/343 156/715 |

(Continued)

FOREIGN PATENT DOCUMENTS

JP    2009-023094 A    2/2009

*Primary Examiner* — Mark A Osele
*Assistant Examiner* — Nickolas R Harm
(74) *Attorney, Agent, or Firm* — Metrolex IP Law Group, PLLC

(57) ABSTRACT

A peeling apparatus according to an embodiment includes: a conveyance roller configured to convey a laminate made by peelably laminating a first substrate and a second substrate including an opening; a peel roller arranged facing the conveyance roller with the laminate interposed in between, and configured to peel the second substrate from the first substrate; a winding roller arranged away from the peel roller, and configured to wind the second substrate peeled from the first substrate; and an auxiliary winding roller arranged between the peel roller and the winding roller, and including a stepped portion configured to maintain a width of the opening.

8 Claims, 17 Drawing Sheets

(56) References Cited

U.S. PATENT DOCUMENTS

| | | | | |
|---|---|---|---|---|
| 4,980,011 | A | * | 12/1990 | Gruber .............. B65H 35/0013 156/238 |
| 5,427,460 | A | * | 6/1995 | Kajiya ................ B65C 11/0289 156/541 |
| 2006/0027333 | A1 | * | 2/2006 | Takami .............. B65C 11/0289 156/764 |
| 2009/0266486 | A1 | * | 10/2009 | Ihara .................... B32B 43/006 156/711 |
| 2012/0132370 | A1 | * | 5/2012 | Chen ................. B65C 11/0289 156/378 |
| 2015/0367622 | A1 | * | 12/2015 | Adachi ............... B32B 37/025 156/759 |

* cited by examiner

PEELING APPARATUS

CROSS REFERENCE TO RELATED APPLICATIONS

This application claims priority based on 35 USC 119 from prior Japanese Patent Application No. 2016-143072 filed on Jul. 21, 2016, entitled "PEELING APPARATUS", the entire contents of which are incorporated herein by reference.

BACKGROUND

1. Field

The disclosure relates to a peeling apparatus configured to perform a peeling process on a laminate of two substrates peelably laminated.

2. Description of Related Art

A peeling apparatus is used to perform a peeling process on a laminate of two substrates peelably laminated. While conveying the laminate, this peeling apparatus peels one substrate from the other substrate, and winds the two substrates on separate rollers.

Various studies have been so far made on the configuration of the peeling apparatus. In one specific configuration, a waste-matrix winding unit removes and winds a waste matrix by using a waste-matrix removal roller and a waste-matrix removal direction correction roller to prevent the waste matrix from breaking apart (see Japanese Patent Application Publication No. 2009-023094, for example).

SUMMARY

There have been various measures taken to stably perform the peeling process on laminates. However, such measures are not sufficient yet. There is still room for improvement in the measures.

An object of an embodiment is to provide a peeling apparatus capable of stably performing a peeling process on a laminate.

An aspect of the invention is a peeling apparatus that include: a conveyance roller configured to convey a laminate made by peelably laminating a first substrate and a second substrate including an opening; a peel roller arranged facing the conveyance roller with the laminate interposed in between, and configured to peel the second substrate from the first substrate; a winding roller arranged away from the peel roller, and configured to wind the second substrate peeled from the first substrate; and an auxiliary winding roller arranged between the peel roller and the winding roller, and including a stepped portion configured to maintain a width of the opening.

According to the aspect of the invention, it is possible to stably perform the peeling process on the laminate.

DETAILED DESCRIPTION OF EMBODIMENTS

Figure 1:
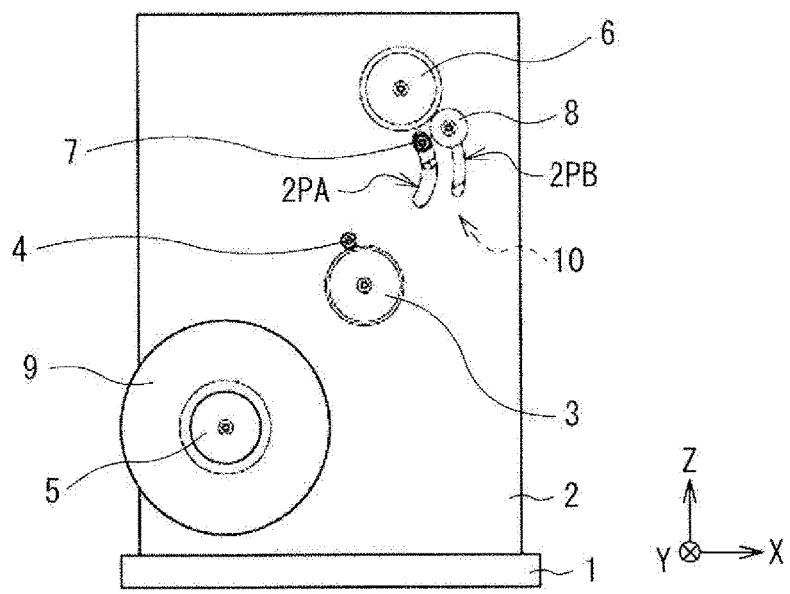
FIG. 1 is a plan view illustrating a configuration of a peeling apparatus of a first embodiment.

Referring to the drawings, detailed descriptions are hereinbelow provided for embodiments of the invention. The descriptions follow the table of contents given below.
1. Peeling Apparatus (First Embodiment)
 1-1. Configuration
  1-1-1. Overall Configuration
  1-1-2. Configuration of Auxiliary Winding Roller
  1-1-3. Configuration of Link Mechanism
  1-1-4. Other Configurations
  1-1-5. Configuration of Laminate
 1-2. Operation
  1-2-1. Peeling Process
  1-2-2. Function of Auxiliary Winding Roller
  1-2-3. Function of Link Mechanism
 1-3. Working and Effects
 1-4. Modifications
2. Peeling Apparatus (Second Embodiment)
 2-1. Configuration
 2-2. Operation
 2-3. Working and Effects
 2-4. Modifications 1. Peeling Apparatus (First Embodiment)

Descriptions are provided for a peeling apparatus of a first embodiment.

1-1. Configuration

Figure 2:
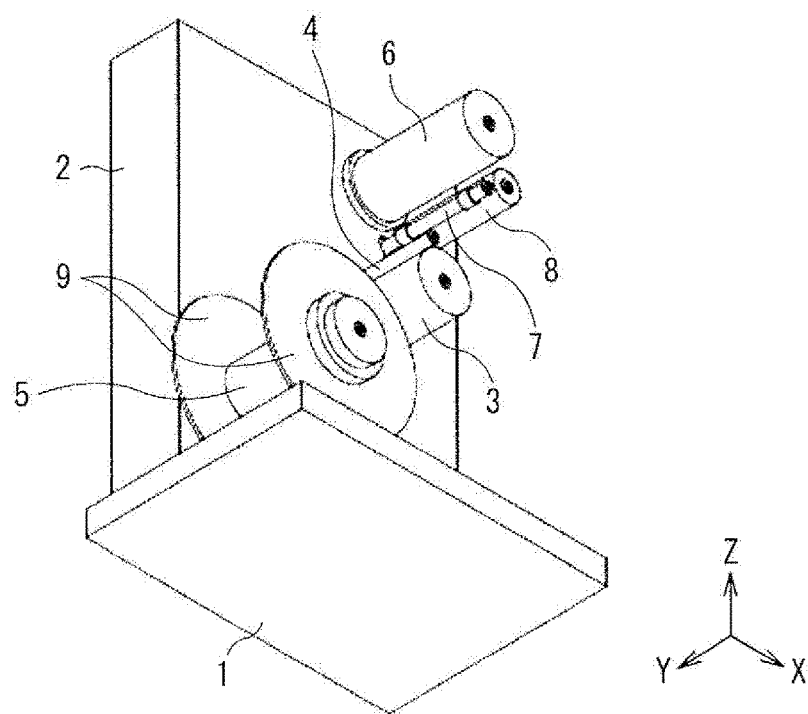
FIG. 2 is a perspective view illustrating the configuration of the peeling apparatus illustrated in FIG. 1.

First of all, descriptions are provided for a configuration of the peeling apparatus. The peeling apparatus discussed therein is used to perform a peeling process on laminate 100 (see FIGS. 9 and 10), which is discussed later. A configuration of laminate 100 is discussed later.
<1-1-1. Overall Configuration>
FIG. 1 illustrates a plan configuration of the peeling apparatus. FIG. 2 illustrates a perspective configuration of the peeling apparatus illustrated in FIG. 1. FIGS. 1 and 2 illustrate a condition in which no laminate 100 has been fed into the peeling apparatus yet, for example.

Hereinbelow, a side at which the peeling apparatus is placed (a lower side in FIGS. 1 and 2) is referred to a "lower side" or "downward," and a side opposite to the side at which the peeling apparatus is placed (an upper side in FIGS. 1 and 2) is referred to an "upper side" or "upward."

The peeling apparatus includes conveyance roller 3, peel roller 4, winding rollers 5, 6, auxiliary winding roller 7 and presser roller 8 on one surface of housing 2 supported by stand 1, for example, as illustrated in FIGS. 1 and 2. The peeling apparatus further includes link mechanism 10, for example, inside housing 2.

Stand 1 and housing 2 each contain any one, two or more of a metal material, a polymer material and the like, for example. Housing 2 has, for example, a three-dimensional box-like shape, and as mentioned above, contains link mechanism 10.

The one surface of housing 2 is provided, for example, with two openings 2PA, 2PB for allowing auxiliary winding roller 7 and presser roller 8 to move along them. Openings 2PA, 2PB curve, for example, along moving directions of auxiliary winding roller 7 and presser roller 8, respectively. FIG. 1 illustrates, for example, a condition before auxiliary winding roller 7 and presser roller 8 move.

In order to enable the peeling process to be performed using peel roller 4, conveyance roller 3 conveys laminate 100 which is fed into the peeling apparatus from the outside. In this case, conveyance roller 3 is arranged, for example, in a substantially central portion in the one surface of housing 2.

Conveyance roller 3 has a three-dimensional cylinder-like shape, extending in a direction (Y direction) intersecting the one surface of housing 2. Conveyance roller 3 is rotatable about an axis of rotation extending in the direction.

It is preferable that conveyance roller 3 be rotatable using rotational force of a motor, or the like. This is because while laminate 100 is being conveyed, the tension of laminate 100 is optimized. Specifically, conveyance roller 3 is a roller whose rotational force (torque) can be adjusted, for example, using a torque limiter. In this sense, conveyance roller 3 is a so-called idle roller.

Specifically, conveyance roller 3, for example, includes: a cylindrical roller main body; and a high-friction material layer covering the outer peripheral surface of the roller main body. The high-friction material layer contains, for example, any one, two or more of materials each with a large coefficient of friction. Specifically, the high-friction material layer contains a polyurethane-based rubber or the like.

Peel roller 4 performs the peeling process on laminate 100 being conveyed by conveyance roller 3. Specifically, peel roller 4 separates unnecessary substrate 100B from necessary substrate 100A by peeling unnecessary substrate 100B from necessary substrate 100A, as discussed later.

Like conveyance roller 3 discussed above, peel roller 4 has a three-dimensional cylinder-like shape, and is rotatable.

Particularly, peel roller 4 is arranged near conveyance roller 3 such that: laminate 100 can be supplied to conveyance roller 3 with necessary substrate 100A and unnecessary substrate 100B kept peelably laminated; and unnecessary substrate 100B can be peeled from necessary substrate 100A when laminate 100 passes by peel roller 4. Specifically, peel roller 4 is arranged facing conveyance roller 3 with laminate 100 interposed in between. Thus, laminate 100 is held between conveyance roller 3 and peel roller 4. In this case, peel roller 4 is arranged, for example, higher than conveyance roller 3.

Winding roller 5 winds necessary substrate 100A which is peeled by peel roller 4 from unnecessary substrate 100B.

Like conveyance roller 3 discussed above, winding roller 5 has a three-dimensional cylinder-like shape, and is rotatable. Specifically, winding roller 5 is rotatable, for example, using rotational force of a motor, or the like.

Particularly, winding roller 5 is arranged away from conveyance roller 3, unlike peel roller 4. In this case, winding roller 5 is arranged, for example, lower than conveyance roller 3.

A pair of flanges 9 are attached respectively to the two end portions of winding roller 5 in its extension direction, for example, in order to prevent the skewing of necessary substrate 100A to be wound by winding roller 5. No specific limitation is imposed on the three-dimensional shapes of flanges 9. Each flange 9 is a circular flat plate, for example.

Winding roller 6 winds unnecessary substrate 100B which is peeled by peel roller 4 from necessary substrate 100A.

Like conveyance roller 3 discussed above, winding roller 6 has a three-dimensional cylinder-like shape, and is rotatable. Specifically, winding roller 6 is rotatable, for example, using rotational force of a motor, or the like.

Particularly, winding roller 6 is arranged away from conveyance roller 3, unlike peel roller 4. In this case, winding roller 6 is arranged, for example, higher than conveyance roller 3.

While unnecessary substrate 100B peeled from necessary substrate 100A is being wound by winding roller 6, auxiliary winding roller 7 controls the conveyance conditions of unnecessary substrate 100B in order to optimize conditions for winding unnecessary substrate 100B on winding roller 6.

Auxiliary winding roller 7 is arranged between peel roller 4 and winding roller 6, as well as away from peel roller 4.

Descriptions are provided for a configuration of auxiliary winding roller 7 later (see FIGS. 3 and 4).

While unnecessary substrate 100B peeled from necessary substrate 100A is being wound by winding roller 6, presser roller 8 presses unnecessary substrate 100B in order to prevent it from loosely coming up. This makes unnecessary substrate 100B less likely to skew, and easier to wind.

Like conveyance roller 3 discussed above, presser roller 8 has a three-dimensional cylinder-like shape, and is rotatable. Specifically, presser roller 8 is rotatable, for example, with conveyance of unnecessary substrate 100B.

Particularly, presser roller 8 is arranged near winding roller 6 in order to make presser roller 8 easy to press unnecessary substrate 100B. Specifically, presser roller 8 is, for example, arranged facing winding roller 6 with unnecessary substrate 100B interposed in between. Thus, unnecessary substrate 100B is held between winding roller 6 and presser roller 8. In this case, presser roller 8 is arranged, for example, lower than winding roller 6.

Descriptions are provided for a configuration of presser roller 8 later (see FIGS. 5 to 8).

While unnecessary substrate 100B is being wound by winding roller 6, link mechanism 10 moves auxiliary winding roller 7 and presser roller 8 in directions away from winding roller 6 with an increase in the diameter (outer diameter) of wound unnecessary substrate 100B.

As mentioned above, link mechanism 10 is contained inside housing 2. Link mechanism 10 is connected to auxiliary winding roller 7 and presser roller 8 through openings 2PA, 2PB, respectively.

Descriptions are provided for a configuration of link mechanism 10 later (see FIG. 5 to FIG. 8).

<1-1-2. Configuration of Auxiliary Winding Roller>

Figure 3:
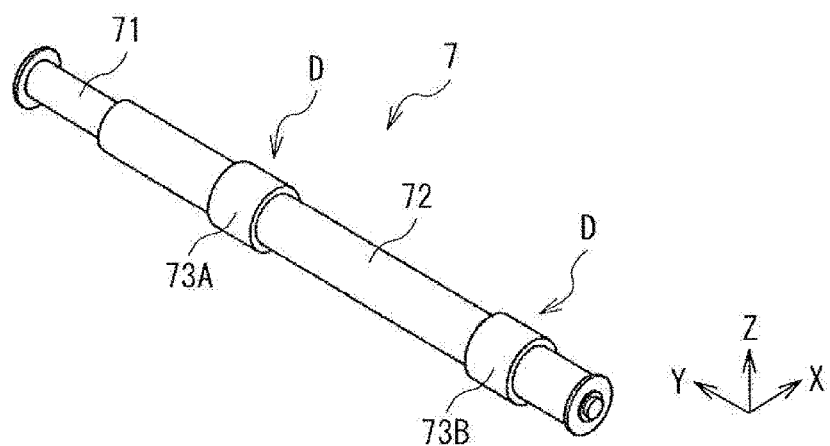
FIG. 3 is a perspective view illustrating a configuration of an auxiliary winding roller.

FIG. 3 illustrates a perspective configuration of auxiliary winding roller 7. FIG. 4 is a plan configuration of auxiliary winding roller 7 illustrated in FIG. 3. Incidentally, in FIG. 4, unnecessary substrate 100B is indicated with dashed lines in order to make a relationship between auxiliary winding roller 7 and unnecessary substrate 100B, while being wound, easy to understand.

As discussed later, unnecessary substrate 100B to be wound by winding roller 6 has opening 120P, and opening 120P has width W (see FIG. 12). Hence, as illustrated in FIGS. 3 and 4, auxiliary winding roller 7 has steps D or stepped portions for preventing width W of opening 120P, provided to unnecessary substrate 100B, from narrowing while unnecessary substrate 100B is being wound by winding roller 6. "Preventing width W of opening 120P from narrowing" means inhibiting or restraining width W of opening 120P from unexpectedly being reduced due to inward force F (see FIG. 23), which is discussed later. In other words, it is prevented that unnecessary substrate 100B abnormally or unexpectedly curves or is bent, and width W of opening 120P is maintained. The stepped portion is configured to maintain width W of opening 120P by preventing a reduction of width W.

Specifically, auxiliary winding roller 7 includes roller shaft 71, roller main body 72, two set pieces 73A, 73B, for example.

Roller shaft 71 has a three-dimensional cylinder-like shape, extending in a direction (Y direction), which is the same as the extension direction of auxiliary winding roller 7. As discussed later, one end portion of roller shaft 71 is connected to link mechanism 10 (see FIGS. 5 to 8).

Roller main body 72 is a ring-shaped member extending in the same direction as roller shaft 71 extends, and covering part of the outer peripheral surface of roller shaft 71. Roller main body 72 has an outer diameter which is larger than that of roller shaft 71, and is rotatable about the center (axis of rotation) of roller shaft 71.

Two set pieces 73A, 73B are two projection portions used to prevent an unexpected reduction of width W of opening 120P, provided to unnecessary substrate 100B, by being inserted into opening 120P, while unnecessary substrate 100B is being wounded by winding roller 6. The use of set pieces 73A, 73B makes width W of opening 120P less likely to narrow, and thereby easier to maintain.

Set pieces 73A, 73B are each a ring-shaped member covering part of the outer peripheral surface of roller main body 72, and each have an outer diameter which is larger than the outer diameter of roller main body 72. Incidentally, since set pieces 73A, 73B are away from each other, set pieces 73A, 73B are placed in the extension direction of roller main body 72. Thus, set piece 73A is inserted into one area of opening 120P, and set piece 73B is inserted into another area of opening 120P.

In this case, steps D are formed, for example, using set pieces 73A, 73B, respectively. Specifically, two steps D are formed, for example, using set pieces 73A, 73B which are away from each other, respectively. As clear from FIG. 4, "steps D" discussed herein mean height differences which are created by set pieces 73A, 73B when set pieces 73A, 73B are brought into contact with parts (two vertical frame portions 122X, which are discussed later) of unnecessary substrate 100B from inside, and which can inhibit the parts of unnecessary substrate 100B from unexpectedly skewing inward while unnecessary substrate 100B is being wound.

In other words, as discussed later, unnecessary substrate 100B, for example, includes two unopened portions (vertical frame portions 122X), or intact portions, which are located at the two sides of opening 120P in a direction intersecting the winding direction of unnecessary substrate 100B. Hence, when inserted into opening 120P, set pieces 73A, 73B, which are away from each other, are brought into contact with two vertical frame portions 122X, respectively. Specifically, set piece 73A is a first projection portion which is inserted into opening 120P, and which is brought into contact with one of two vertical frame portions 122X from inside. Set piece 73B is a second projection portion which is inserted into opening 120P, and which is brought into contact with the other of two vertical frame portions 122X from inside.

It should be noted that set pieces 73A, 73B may or may not be fixed to roller main body 72.

It is preferable, nevertheless, that set pieces 73A, 73B each be movable in the extension direction of roller main body 72, and fixable to roller main body 72 at desired positions.

In the case where set pieces 73A, 73B each are movable in the extension direction of roller main body 72, auxiliary winding roller 7 need not be replaced even when width W of opening 120P is changed. This is because set pieces 73A, 73B can be inserted into opening 120P by changing the positions of set pieces 73A, 73B.

In the case where set pieces 73A, 73B are fixable to roller main body 72, set pieces 73A, 73B rotate together with roller main body 72 while unnecessary substrate 100B is being wound. Thus, set pieces 73A, 73B do not hinder the winding of unnecessary substrate 100B. In addition, set pieces 73A, 73B are less likely to unexpectedly move while unnecessary substrate 100B is being wound. Thereby, width W of opening 120P is inhibited from narrowing despite the use of set pieces 73A, 73B.

<1-1-3. Configuration of Link Mechanism>

Figure 5:
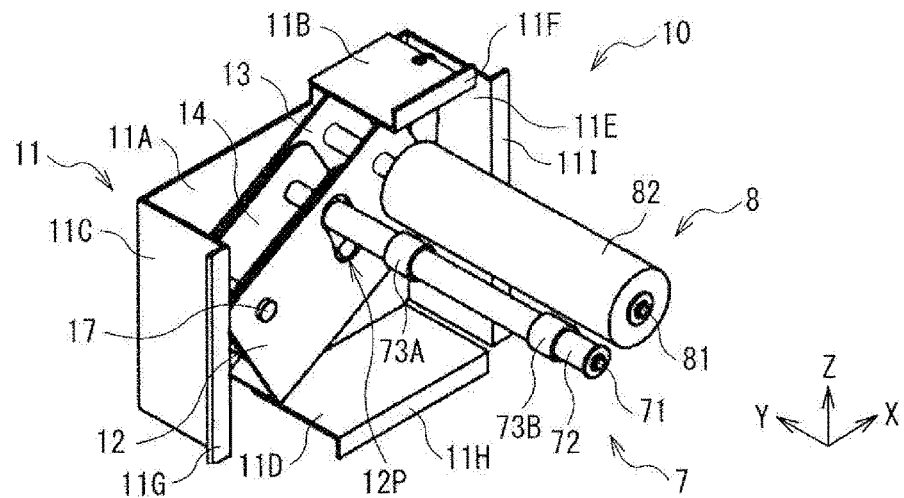
FIG. 5 is a perspective view illustrating a configuration of a link mechanism (before the auxiliary winding roller moves).
Figure 6:
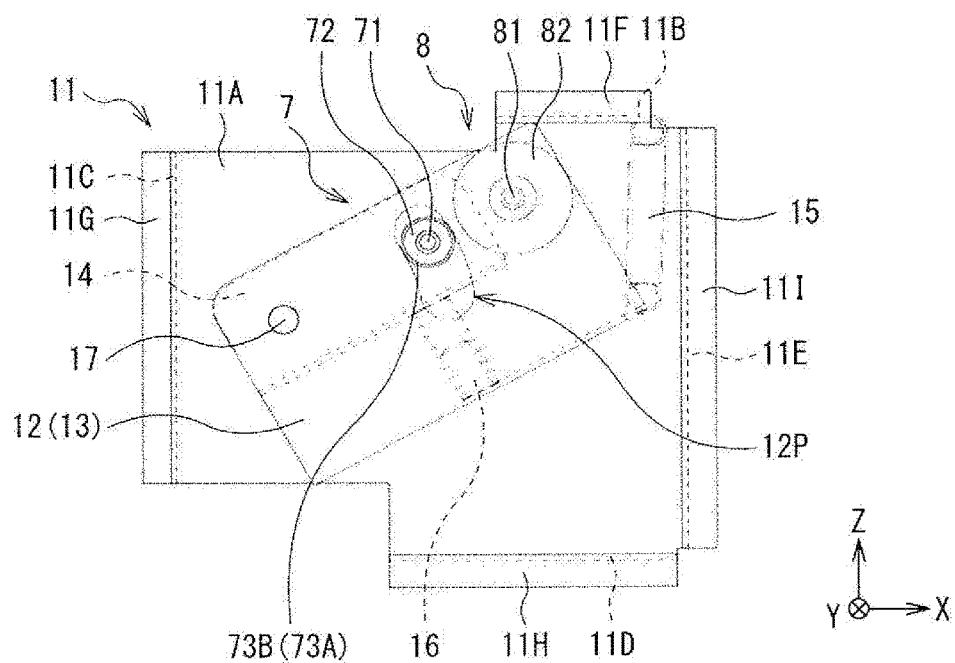
FIG. 6 is a plan view illustrating the configuration of the link mechanism illustrated in FIG. 5.
Figure 7:
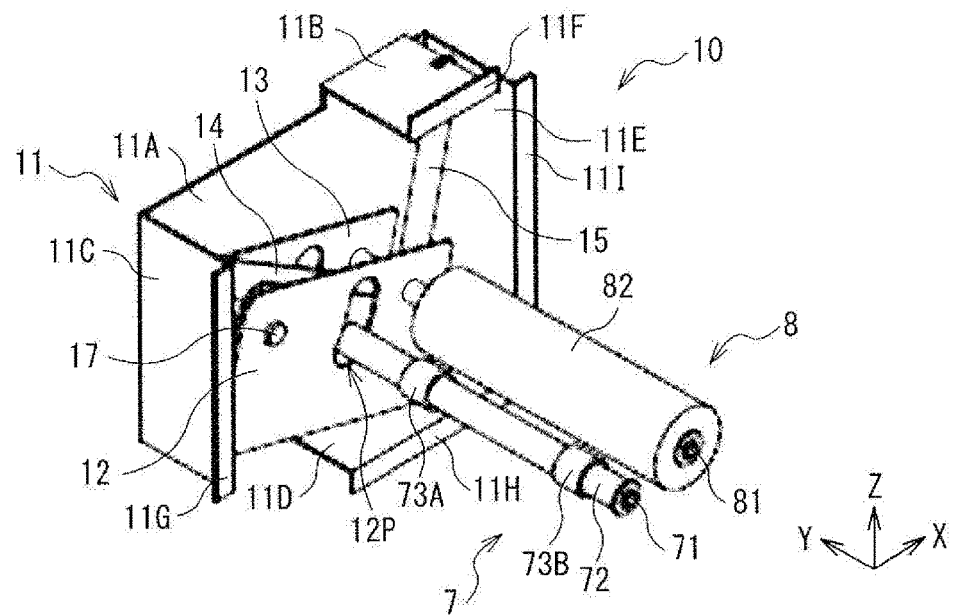
FIG. 7 is a perspective view illustrating the configuration of the link mechanism (while the auxiliary winding roller is moving).
Figure 8:
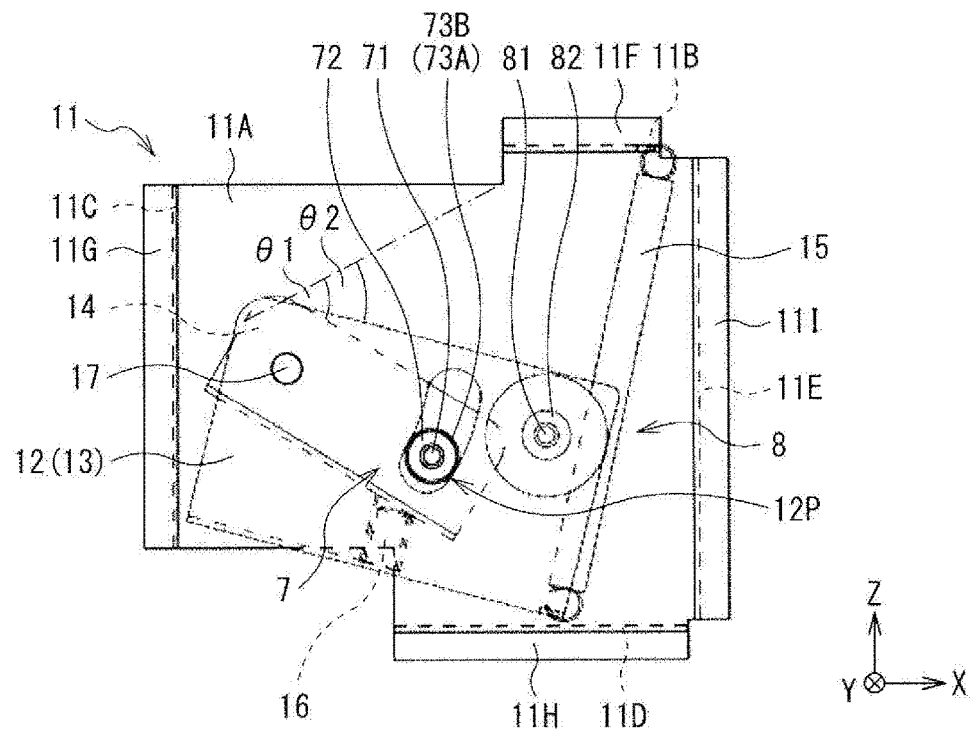
FIG. 8 is a plan view illustrating the configuration of the link mechanism illustrated in FIG. 7.

FIG. 5 illustrates a perspective configuration of link mechanism 10 before auxiliary winding roller 7 moves, and FIG. 6 illustrates a plan configuration of link mechanism 10 illustrated in FIG. 5. FIG. 7 illustrates a perspective configuration of link mechanism 10 while auxiliary winding roller 7 is moving, and FIG. 8 illustrates a plan configuration of link mechanism 10 illustrated in FIG. 7.

FIGS. 5 to 8 mentioned above, and FIGS. 1 to 4 whenever deemed necessary are referred to for the following explanation.

Auxiliary winding roller 7 and presser roller 8 are each rotatably supported by link mechanism 10, for example, as illustrated in FIGS. 5 to 8.

Presser roller 8, for example, includes: cylindrical roller shaft 81 extending in a direction (Y direction), which is the same as the extension direction of auxiliary winding roller 7; and ring-shaped roller main body 82 extending in a direction which is the same as the extension direction of roller shaft 81, and covering part of the outer peripheral surface of roller shaft 81. Roller main body 82 has an outer diameter which is larger than that of roller shaft 81, and is rotatable about the center (axis of rotation) of roller shaft 81.

Link mechanism 10 includes support plate 11, main turn plates 12, 13, secondary turn plate 14, and biasing members 15, 16, for example, as illustrated in FIGS. 5 to 8.

Support plate 11 supports main turn plates 12, 13, secondary turn plate 14, and biasing members 15, 16. Support plate 11, for example, has a three-dimensional, substantially box-like shape with four sides of the single plate-shaped member being folded toward housing 2.

Specifically, support plate 11, for example, includes one bottom surface portion 11A, four wall surface portions 11B to 11E, and four attachment portions 11F to 11I.

Bottom surface portion 11A, for example, extends in a direction along one surface of housing 2, and is away from the one surface of housing 2. Wall surface portions 11B to 11E each, for example, extend in a direction intersecting the one surface of housing 2, and are respectively connected to the four sides of bottom surface portion 11A. The width of each of wall surface portions 11B to 11E may be set arbitrarily. The "width of each of wall surface portions 11B to 11E" discussed herein means a dimension of the wall surface portion in a direction intersecting its extension direction. Attachment portions 11F to 11I each, for example, extend in a direction along the one surface of housing 2, and are respectively connected to wall surface portions 11B to 11E.

Support plate 11 is attached to housing 2, for example, by fixing each of attachment portions 11F to 11I to one surface of housing 2 using any one, two or more types of fixing members such as adhesive and a screw. The "one surface of housing 2" discussed herein means an opposite surface (back surface) of housing 2 from the one surface (front surface) on which conveyance roller 3 and the like are arranged.

Using their turning action with the increase in the winding diameter of unnecessary substrate 100B wound by winding roller 6, main turn plates 12, 13 move auxiliary winding roller 7 and presser roller 8 in directions away from winding roller 6. Main turn plates 12, 13 each have a three-dimensional, substantially-rectangular flat shape, for example.

Main turn plates 12, 13 are arranged facing each other with a space in between in the extension directions of auxiliary winding roller 7 and presser roller 8. Main turn plates 12, 13 are each turnable about pivot shaft 17, one end portion of which is fixed to support plate 11 (bottom surface portion 11A).

Opening 12P, for example, is provided to a part of main turn plate 12 which is situated closer to housing 2, and the part thereof corresponds to opening 2PA provided to housing 2. Like opening 2PA, opening 12P curves, for example, along the moving direction of auxiliary winding roller 7.

Roller shaft 71 of auxiliary winding roller 7 is fixed to secondary turn plate 14, which is arranged between main turn plates 12, 13, by reaching secondary turn plate 14 via opening 12P provided to main turn plate 12. Thus, in response to the turning action of secondary turn plate 14, roller shaft 71 is movable inside opening 12P.

Roller shaft 81 of presser roller 8 is fixed to main turn plate 13 by penetrating main turn plate 12 and reaching main turn plate 13. Thus, main turn plates 12, 13 are turnable about pivot shaft 17 together, while presser roller 8 is movable in response to the turning action of main turn plates 12, 13.

With the increase in the winding diameter of unnecessary substrate 100B wound by winding roller 6, using its turning action, secondary turn plate 14 moves auxiliary winding roller 7. Like main turn plates 12, 13, secondary turn plate 14 has a three-dimensional, substantially-rectangular flat shape, for example.

Furthermore, secondary turn plate 14 is arranged between main turn plates 12, 13 while facing main turn plates 12, 13. Like main turn plates 12, 13, secondary turn plate 14 is turnable about pivot shaft 17. Since roller shaft 71 of auxiliary winding roller 7 is fixed to secondary turn plate 14, auxiliary winding roller 7 is movable in response to the turning action of secondary turn plate 14.

Since roller shaft 71 is movable inside opening 12P as discussed above, auxiliary winding roller 7 is also influenced by the turning action of main turn plate 13 while moving in response to the turning action of secondary turn plate 14. In other words, auxiliary winding roller 7 is movable with the turning action of main turn plates 12, 13, and is movable with the turning action of secondary turn plate 14.

Biasing member 15 biases main turn plates 12, 13 upward, and is, for example, a spring member such as a coiled spring. One end portion of biasing member 15 is fixed, for example, to wall surface portions 11B of support plate 11, while the other end portion of biasing member 15 is fixed to a corner portion of main turn plate 12. In this case, the other end portion of biasing member 15, for example, is fixed, for example, to a corner portion of main turn plate 12 which is located closer to wall surface portions 11D, 11E.

Before their turn (FIGS. 5 and 6), main turn plates 12, 13 are lifted upward using contractile action of biasing member 15. Thereby, main turn plates 12, 13 tilt upward to the right, and presser roller 8 is lifted upward. Incidentally, before the turn of main turn plates 12, 13, for example, a corner portion of main turn plate 13, more specifically a corner portion thereof located closer to wall surface portions 11B, 11E, is in contact with wall surface portion 11B. Thus, main turn plates 12, 13 remain stationary in a state of tilting upward to the right.

The reason why main turn plates 12, 13 are lifted upward using biasing member 15 is that presser roller 8 is biased against unnecessary substrate 100B while unnecessary substrate 100B is being wound by winding roller 6. Thereby, unnecessary substrate 100B is wound by winding roller 6 while pressed against winding roller 6 by presser roller 8. This makes it easy to wind unnecessary substrate 100B while preventing unnecessary substrate 100B from skewing.

While main turn plates 12, 13 are turning (FIGS. 7 and 8), presser roller 8 is pushed downward by unnecessary substrate 100B wound by winding roller 6, and thus moves downward. Thereby, main turn plates 12, 13 turn each about pivot shaft 17 in a clockwise direction, and tilt downward to the right. In this case, biasing member 15 is pulled by main turn plate 12, and accordingly extends.

Biasing member 16 biases secondary turn plate 14 upward, and is, for example, a spring member such as a coiled spring. One end portion of biasing member 16 is fixed, for example, to one end portion of main turn plate 12, while the other end portion of biasing member 16 is fixed to one end portion of secondary turn plate 14.

Before its turn (FIGS. 5 and 6), secondary turn plate 14 is lifted upward using elongation action of biasing member 16. Thereby, secondary turn plate 14 tilts upward to the right, and auxiliary winding roller 7 is lifted upward. Incidentally, before the secondary turn plate 14 turn, a movement range of roller shaft 71 is restricted by opening 12P. Thus, auxiliary winding roller 7 remains stationary in a state of tilting upward.

The reason why secondary turn plate 14 is lifted upward using biasing member 16 is that auxiliary winding roller 7 is biased against unnecessary substrate 100B while unnecessary substrate 100B is being wound by winding roller 6. Thereby, auxiliary winding roller 7 is pressed against unnecessary substrate 100B. This makes set pieces 73A, 73B easy to insert into opening 120P provided to unnecessary substrate 100B.

As discussed above, secondary turn plate 14 turns in response to the turning action of main turn plates 12, 13. While secondary turn plate 14 is turning about pivot shaft 17 in the clockwise direction (FIGS. 7 and 8), auxiliary winding roller 7 moves downward. Thereby, like main turn plates 12, 13, secondary turn plate 14 tilts downward to the right. In this case, secondary turn plate 14 pushes biasing member 16, and therefore, biasing member 16 contracts.

It should be noted that as discussed above, roller shaft 71 is movable inside opening 12P. Thus, secondary turn plate 14 can tilt further downward to the right than main turn plates 12, 13. For this reason, auxiliary winding roller 7 can move to a lower position than that of presser roller 8.

<1-1-4. Other Configurations>

It should be noted that the peeling apparatus may include, for example, any one, two or more of other components in addition to the above-discussed components.

No specific limitation is imposed on what the other components are. Examples of the other components include: a torque limiter configured to control the rotation of conveyance roller 3; a motor configured to rotate winding roller 5; a motor configured to rotate winding roller 6; and a control circuit configured to control the operation of the peeling apparatus.

No specific limitation is imposed on the configuration of the torque limiter, or a principle on which the torque limiter works. This torque limiter is, for example, of a magnetic type using a permanent magnet. The torque limiter applies load of approximately hundreds gf to conveyance roller 3 using magnetic force of the permanent magnet.

The control circuit, for example, includes an electronic circuit such as a central processing unit (CPU).

<1-1-5. Configuration of Laminate>

No specific limitation is imposed on the configuration of laminate 100, as long as the two substrates, more specifically, one substrate and the other substrate having openings are peelably laminated together. The one substrate may or may not include openings while the other substrate includes openings. Furthermore, the two substrates each may be single-layered or multilayered.

Moreover, no specific limitation is imposed on what purpose laminate 100 serves, as long as the peeling process using the peeling apparatus needs to be performed on laminate 100 for some reason.

Figure 9:
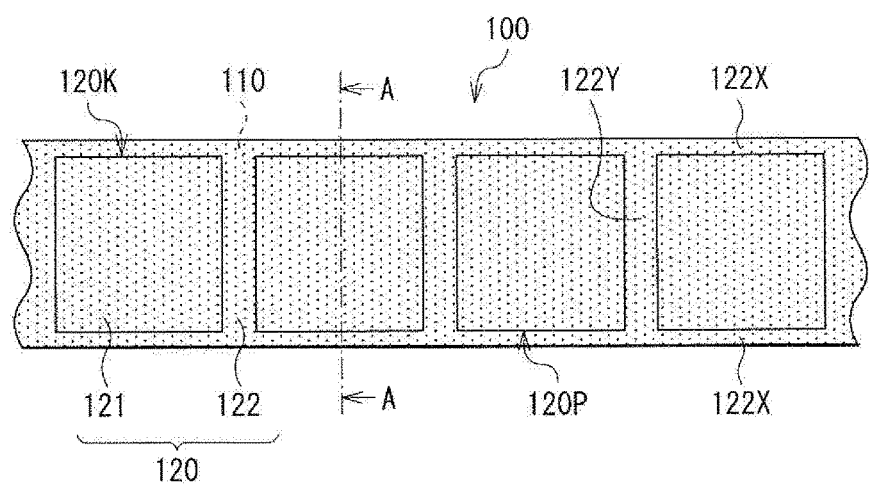
FIG. 9 is a plan view illustrating a configuration of a laminate.
Figure 10:
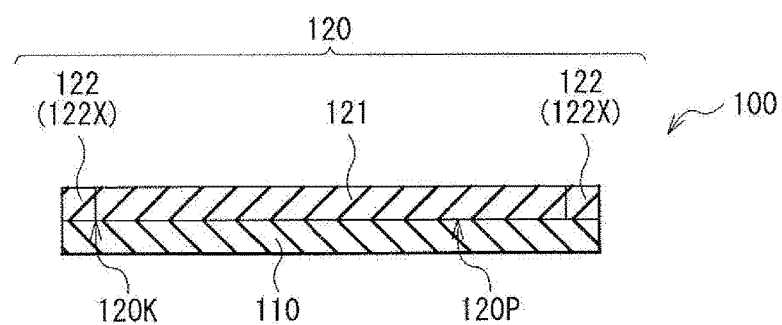
FIG. 10 is a cross-sectional view illustrating the configuration of the laminate taken along the A-A line of FIG. 9.
Figure 11:
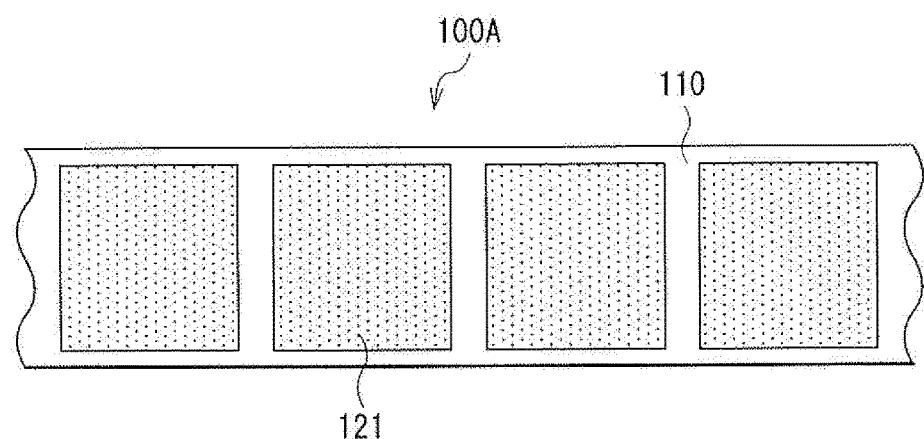
FIG. 11 is a plan view illustrating a configuration of a necessary substrate.

FIG. 9 illustrates a plan configuration of laminate 100. FIG. 10 illustrates a cross-sectional configuration of laminate 100 taken along the A-A line of FIG. 9. FIG. 11 illustrates a plan configuration of necessary substrate 100A. FIG. 12 illustrates a plan configuration of unnecessary substrate 100B.

Laminate 100 is made, for example, by peelably laminating necessary substrate 100A and unnecessary substrate 100B having openings 120P.

Necessary substrate 100A is a part (first substrate) of laminate 100 which is used as a product. On the other hand, unnecessary substrate 100B is the other part (second substrate) of laminate 100 which is not used as a product, and is therefore discarded whenever deemed appropriate. Incidentally, necessary substrate 100A and unnecessary substrate 100B discussed herein are distinguished from each other for mere convenience sake in order to discuss the configuration and the like of the peeling apparatus of the embodiment. Like necessary substrate 100A, unnecessary substrate 100B may be used as a product.

Specifically, laminate 100 has a planar, long strip-like shape in order to be continuously conveyed while fed into the peeling apparatus, for example, as illustrated in FIGS. 9 and 10. Laminate 100, for example, includes a release substrate 110; and seal substrate 120 peelably bonded to one surface of release substrate 110. In FIG. 9, seal substrate 120 is hatched for the purpose of easily distinguishing between release substrate 110 and seal substrate 120. Like in FIG. 9, seal substrate 120 is hatched in FIGS. 11 and 12.

Release substrate 110 is a substrate to peelably support seal substrate 120. One surface of release substrate 110, which is contiguous to seal substrate 120, is provided, for example, with a release layer or the like configured to allow seal substrate 120 to be peeled from release substrate 110. No specific limitation is imposed on the material of release substrate 110. Release substrate 110, for example, may be made of paper, plastic film, or other material.

Seal substrate 120 is a substrate to be peeled from release substrate 110 depending on a desired purpose. One surface of seal substrate 120, which is contiguous to release substrate 110, is provided, for example, with an adhesive layer or the like configured to secure the stickiness of seal substrate 120 to release substrate 110. No specific limitation is imposed on the material of seal substrate 120. Seal substrate 120, for example, may be made of paper, plastic film, or other material.

Laminate 100 discussed herein is, for example, a half-cut seal, in other words, a label-type seal. Specifically, cuts 120K are made in seal substrate 120 such that cuts 120K, for example, have a desired pattern shape (planar shape). Thus, seal substrate 120, for example, includes: areas (label portions 121) respectively surrounded by cuts 120K; and the other area (non-label portion 122). Label portions 121 are peeled from release substrate 110 depending on the necessity.

No specific limitation is imposed on the planar shape of label portions 121, as long as the planar shape thereof is any one, two or more of arbitrary planar shapes. In this case, for example, the planar shape of label portions 121 is, for example, rectangular.

Furthermore, no restriction is imposed on how many label portions 121 are included in seal substrate 120, or how label portions 121 are arranged therein. Specifically, the number of label portions 121 may be one, or two or more (multiple). In addition, label portions 121 may be arranged regularly or at random. In this case, the number of label portions 121 is multiple, for example. In addition, multiple label portions 121 are arranged regularly. Specifically, multiple label portions 121 are arranged, for example, at equal intervals in the extension direction of seal substrate 120.

While the peeling process using peeling apparatus is being performed, laminate 100 is separated into necessary substrate 100A and unnecessary substrate 100B by peeling unnecessary substrate 100B from necessary substrate 100A.

Necessary substrate 100A is a part of laminate 100 which remains after non-label portion 122 is removed from laminate 100, for example, as illustrated in FIG. 11. Necessary substrate 100A, for example, includes: release substrate 110; and multiple label portions 121 provided to the one surface of release substrate 110.

Figure 12:
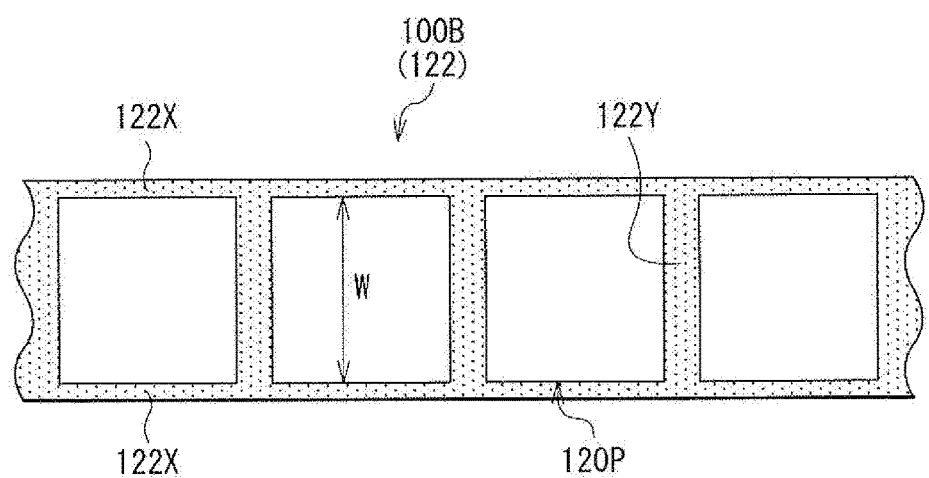
FIG. 12 is a plan view illustrating a configuration of an unnecessary substrate.

Since unnecessary substrate 100B is non-label portion 122 peeled from release substrate 100, unnecessary substrate 100B includes multiple openings 120P, for example, as illustrated in FIG. 12. Non-label portion 122, for example, includes: vertical frame portions 122X extending in the winding direction of unnecessary substrate 100B (or in the extension direction of unnecessary substrate 100B); and transverse frame portions 122Y extending in a direction intersecting the winding direction of unnecessary substrate 100B.

Specifically, for example, two vertical frame portions 122X, which are two unopened portions, are arranged respectively on the two sides of openings 120P in the direction intersecting the winding direction of unnecessary substrate 100B. In addition, for example, one transverse frame portion 122Y is arranged between each two adjacent openings 120P.

1-2. Operation

Figure 13:
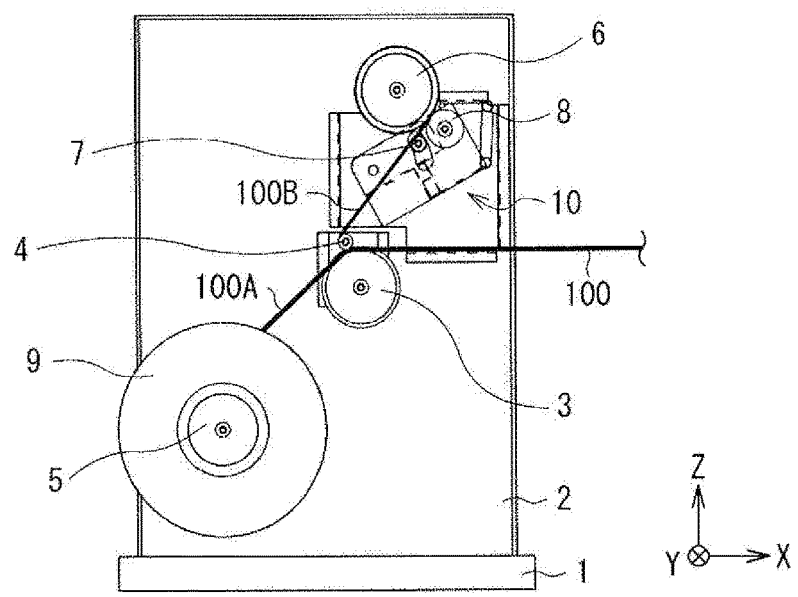
FIG. 13 is a plan view for explaining how the peeling apparatus works (before the auxiliary winding roller moves).
Figure 14:
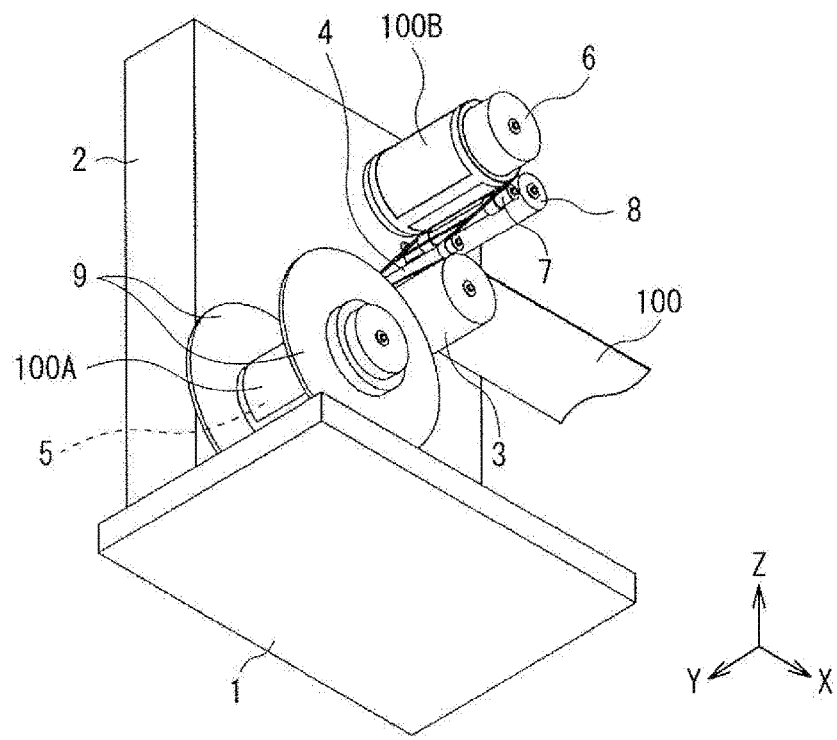
FIG. 14 is a perspective view illustrating the configuration of the peeling apparatus illustrated in FIG. 13.
Figure 15:
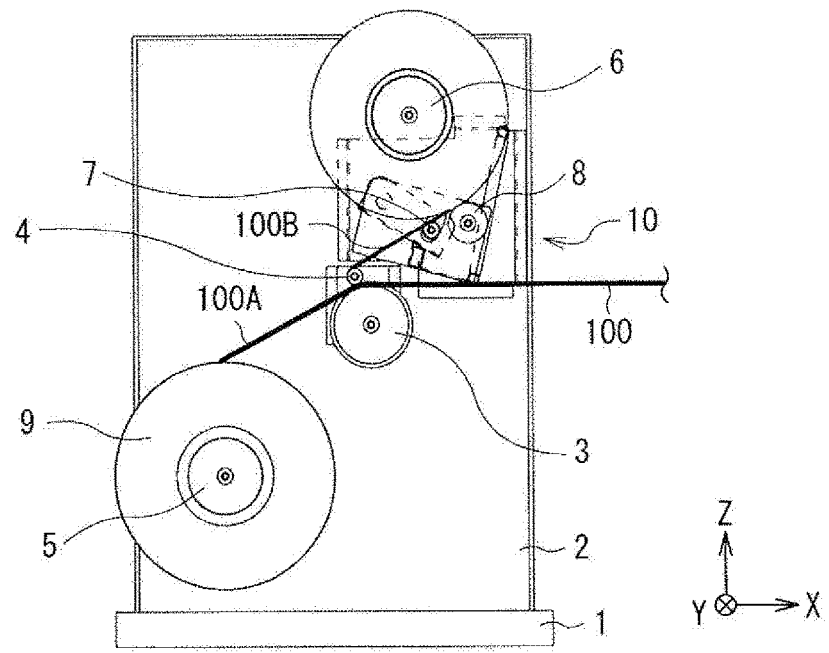
FIG. 15 is a plan view for explaining how the peeling apparatus works (while the auxiliary winding roller is moving).
Figure 16:
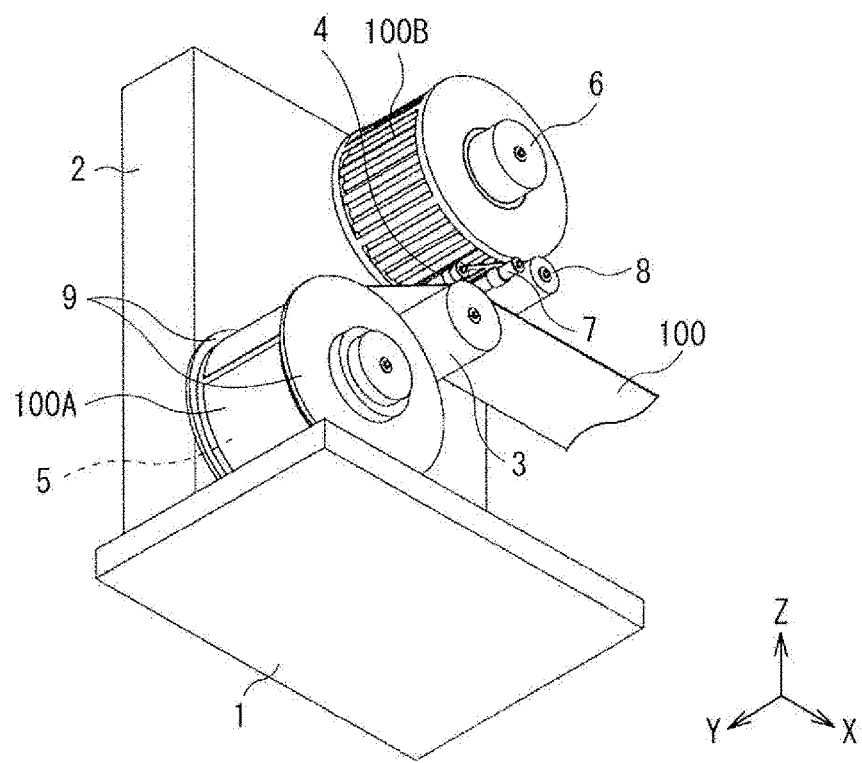
FIG. 16 is a perspective view illustrating the configuration of the peeling apparatus illustrated in FIG. 15.

Next, descriptions are provided for how the peeling apparatus works.
<1-2-1. Peeling Process>
The peeling apparatus performs the peeling process on laminate 100 according to the following procedure. FIG. 13 illustrates a plan configuration of the peeling apparatus before the movement of auxiliary winding roller 7 for the purpose of explaining how the peeling apparatus works. FIG. 14 illustrates a perspective configuration of the peeling apparatus illustrated in FIG. 13. Specifically, FIGS. 13 and 14 illustrate the condition of the peeling apparatus before unnecessary substrate 100B is wound by winding roller 6. FIG. 15 illustrates a plan configuration of the peeling apparatus during the movement of auxiliary winding roller 7 for the purpose of explaining how the peeling apparatus works. FIG. 16 is a perspective configuration of the peeling apparatus illustrated in FIG. 15. Specifically, FIGS. 15 and 16 illustrate a case where the winding diameter of unnecessary substrate 100B increases as a result of the winding of unnecessary substrate 100B by winding roller 6.

It should be noted that: FIGS. 13 and 15 correspond to FIG. 1; and FIGS. 14 and 16 correspond to FIG. 2. Furthermore, FIGS. 13 and 15 illustrate conditions of the peeling apparatus by cutting away one surface (surface in which openings 2PA, 2PB are provided) of housing 2 illustrated in FIG. 1 for the purpose of making it easy to see how link mechanism 10 works.

FIGS. 13 to 16 mentioned above, and FIGS. 1 to 12 whenever deemed necessary are referred to for the following explanation.

To use the peeling apparatus, laminate 100 is supplied to the peeling apparatus, for example, from an external apparatus. No restriction is imposed on the type of the external apparatus as long as the external apparatus is any one, two or more of apparatuses capable of continuously supplying laminate 100 to the peeling apparatus.

Specifically, the external apparatus may be, for example, a delivery apparatus configured to deliver laminate 100, wound in a roll, to the outside. Alternatively, the external apparatus may be, for example, an image formation apparatus (so-called printer) configured to: form an image on the surface of laminate 100 wound from a roll; and thereafter deliver laminate 100 with the image formed thereon to the outside. Particularly, the image formation apparatus configured to forms an image using laminate 100 which is a label-type seal may be, for example, a label printer. No specific restriction is imposed on the image formation method of the image formation apparatus. The image formation method of the image formation apparatus is, for example, an electrographic method. Needless to say, the external apparatus is not limited to the above-mentioned delivery apparatus or image formation apparatus, and may be another type of apparatus.

It should be noted that the peeling apparatus may be connected to the external apparatus using a connecting cable or the like, for example, to make the peeling apparatus work with the external apparatus.

In this peeling apparatus, laminate 100 is supplied to conveyance roller 3 when laminate 100 is fed into the peeling apparatus from the external apparatus, for example, as illustrated in FIGS. 13 and 14.

In this case, for example, release substrate 110 is arranged on the lower side (closer to conveyance roller 3), while seal substrate 120 is arranged on the upper side (farther from conveyance roller 3).

After supplied to conveyance roller 3, laminate 100 is conveyed to the vicinity of peel roller 4 using the rotation of conveyance roller 3.

After laminate 100 reaches the vicinity of peel roller 4, while laminate 100 is passing between conveyance roller 3 and peel roller 4, unnecessary substrate 100B (non-label portion 122) is peeled from necessary substrate 100A (release substrate 110 and label portions 121. Since unnecessary substrate 100B is conveyed to winding roller 6 via peel roller 4, unnecessary substrate 100B is wound by winding roller 6.

Particularly, while unnecessary substrate 100B is being wound by winding roller 6, use of the function of auxiliary winding roller 7 inhibits abnormality from occurring due to the winding of unnecessary substrate 100B. The function of auxiliary winding roller 7 is discussed later.

In this case, since presser roller 8 presses unnecessary substrate 100B against winding roller 6, unnecessary substrate 100B is easily wound by winding roller 6. Furthermore, using the function of link mechanism 10 with the increase in the winding diameter of unnecessary substrate 100B, auxiliary winding roller 7 and presser roller 8 move in a direction away from winding roller 6. The function of link mechanism 10 is discussed later.

Meanwhile, necessary substrate 100A, from which unnecessary substrate 100B is peeled, is conveyed to winding roller 5 via conveyance roller 3, and is thereby wound by winding roller 5. In this case, use of the pair of flanges 9 attached to winding roller 5 inhibits necessary substrate 100A from skewing while necessary substrate 100A is being wound by winding roller 5.

While laminate 100 is continuously supplied to the peeling apparatus from the external apparatus, the peeling apparatus continuously performs the peeling process on laminate 100. Thereby, unnecessary substrate 100B is continuously peeled from necessary substrate 100A, while necessary substrate 100A and unnecessary substrate 100B are continuously wound separately. Thus, necessary substrate 100A can be collected from laminate 100.

<1-2-2. Function of Auxiliary Winding Roller>

While unnecessary substrate 100B is being wound by winding roller 6, auxiliary winding roller 7 inhibits abnormality from occurring due to the winding of unnecessary substrate 100B, as discussed below.

FIGS. 17 to 21 illustrate plan configurations of part of unnecessary substrate 100B and auxiliary winding roller 7, which are illustrated in FIGS. 13 and 15, for the purpose of explaining relationships between unnecessary substrate 100B and auxiliary winding roller 7 while the peeling apparatus is working (performing the peeling process).

FIGS. 17 to 21 mentioned above, and FIGS. 3 and 4 whenever deemed necessary are referred to for the following explanation.

While unnecessary substrate 100B with openings 120P is being wound by winding roller 6, auxiliary winding roller 7 is arranged on a conveyance passage of unnecessary substrate 100B between peel roller 4 and winding roller 6. Auxiliary winding roller 7 is provided with two steps D which are created by set pieces 73A, 73B, as illustrated in FIG. 7.

Figure 4:
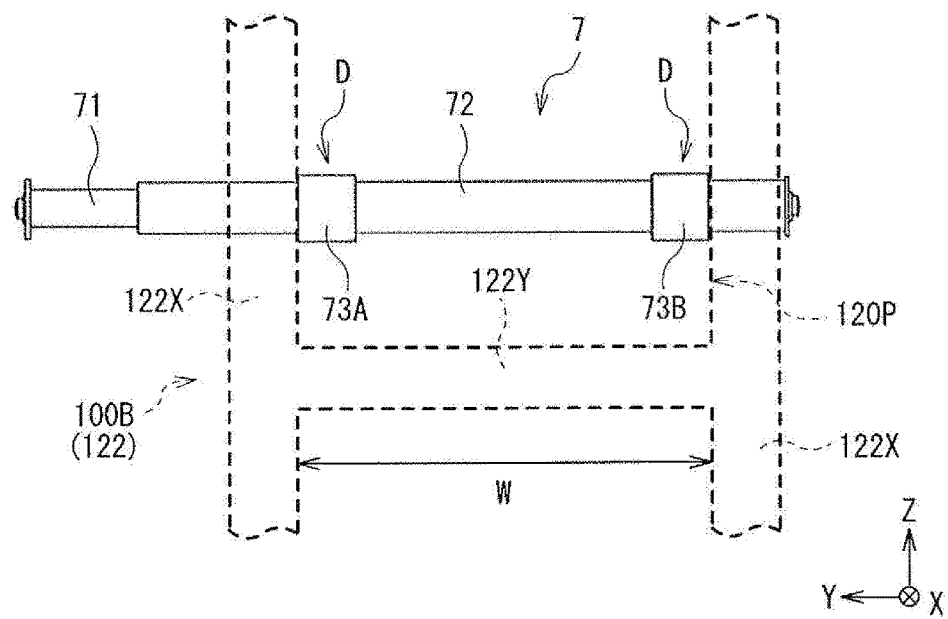
FIG. 4 is a plan view illustrating the configuration of the auxiliary winding roller illustrated in FIG. 3.

In this case, as illustrated in FIG. 4, while unnecessary substrate 100B is passing near auxiliary winding roller 7, set piece 73A is inserted in one area of opening 120A, and set piece 73B is inserted in another area of opening 120P. Thereby, one of two vertical frame portions 122X which are respectively located on the two sides of opening 120P is arranged outside set piece 73A (in the right in FIG. 4), and the other is arranged outside set piece 73B (in the left in FIG. 4).

In this case, set piece 73A is in contact with the one of vertical frame portions 122X from inside. Thus, the conveyance passage of the one of vertical frame portions 122X is less likely to shift inward of set piece 73A (to the right in FIG. 4) while unnecessary substrate 100B is being conveyed to winding roller 6 via auxiliary winding roller 7. Thereby, the conveyance passage of the one of vertical frame portions 122X is held outside set piece 73A.

Meanwhile, set piece 73B is in contact with the other of vertical frame portions 122X from inside. Thus, the conveyance passage of the other of vertical frame portions 122X is less likely to shift inward of set piece 73B (to the left in FIG. 4) while unnecessary substrate 100B is being conveyed to winding roller 6 via auxiliary winding roller 7. Thereby, the conveyance passage of the other of vertical frame portions 122X is held outside set piece 73B.

The advantage that the use of set pieces 73A, 73B makes the conveyance passages of vertical frame portions 122X less likely to shift can be obtained through substantially all the process of conveying unnecessary substrate 100B.

Figure 17:
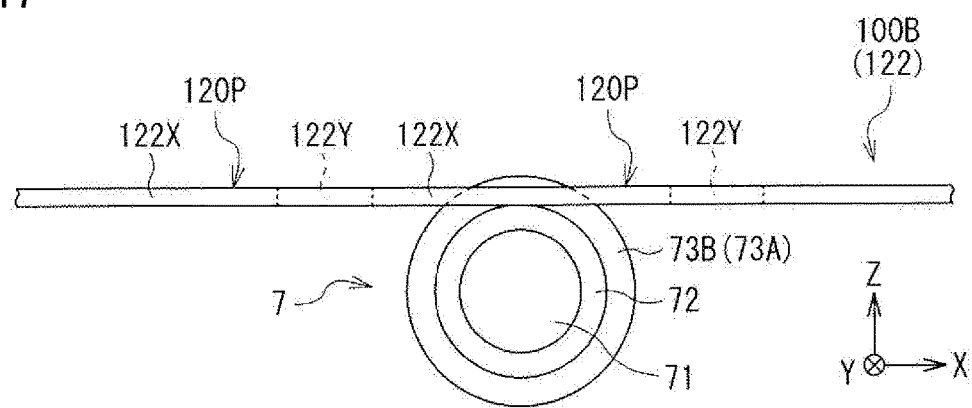
FIG. 17 is a plan view for explaining what relationship is between the unnecessary substrate and the auxiliary winding roller while the peeling apparatus is working.

Specifically, first of all, while two vertical frame portions 122X are passing near auxiliary winding roller 7 (see FIG. 4), set pieces 73A, 73B are inserted in opening 120P, as illustrated in FIG. 17. This makes the conveyance passages of vertical frame portions 122X less likely to shift inward, as discussed above. This accordingly prevents an unexpected reduction of width W of opening 120P.

Figure 18:
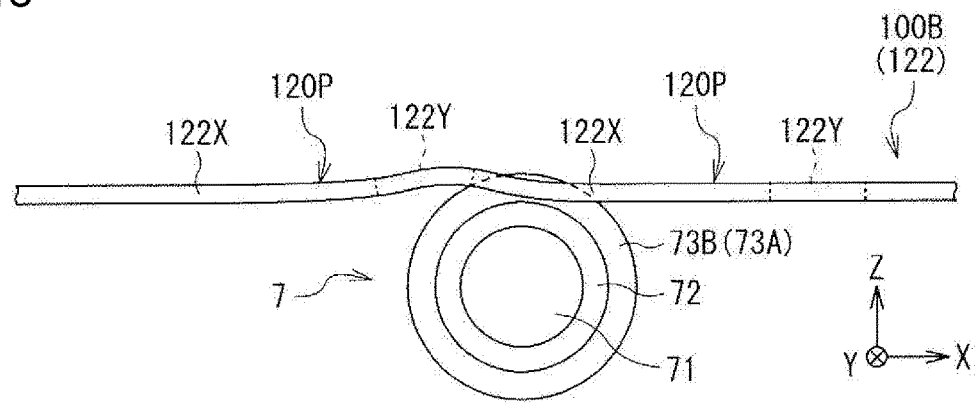
FIG. 18 is a plan view for explaining what relationship is between the unnecessary substrate and the auxiliary winding roller, which follows FIG. 17.

Thereafter, as unnecessary substrate 100B continues moving in its conveyance direction (rightward) with the winding of unnecessary substrate 100B by winding roller 6, transverse frame portion 122Y upstream of opening 120P reaches the vicinity of set pieces 73A, 73B, as illustrated in FIG. 18. In this case, set pieces 73A, 73B still remain inserted in opening 120P. Accordingly, the conveyance passages of vertical frame portions 122X are less likely to shift inward.

Figure 19:
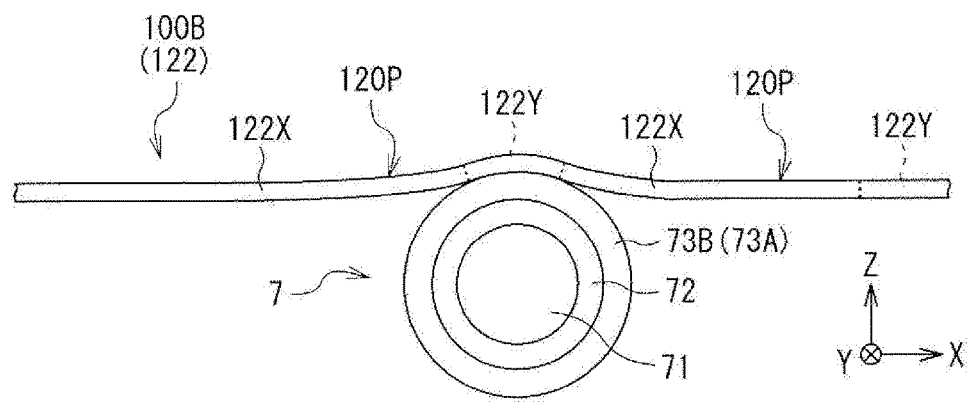
FIG. 19 is a plan view for explaining what relationship is between the unnecessary substrate and the auxiliary winding roller, which follows FIG. 18.

After that, as unnecessary substrate 100B continues moving, transverse frame portion 122Y goes up onto set pieces 73A, 73B, as illustrated in FIG. 19. Thus, set pieces 73A, 73B get out of opening 120P. While in this condition, since set pieces 73A, 73B are not inserted in opening 120P, there is likelihood that the conveyance passages of vertical frame portions 122X are more likely to shift inward.

Figure 20:
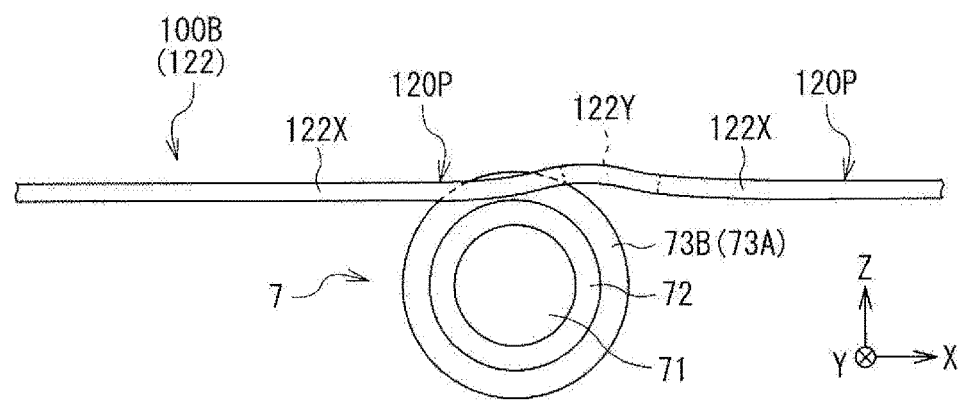
FIG. 20 is a plan view for explaining what relationship is between the unnecessary substrate and the auxiliary winding roller, which follows FIG. 19.

However, as unnecessary substrate 100B further move, transverse frame portion 122Y goes down from set pieces 73A, 73, and set pieces 73A, 73B are accordingly inserted into another opening 120P upstream of previous opening 120P, as illustrated in FIG. 20. Thus, the conveyance passages of two other vertical frame portions 122X upstream of two previous vertical frame portions 122X become less likely to shift inward.

As discussed above, although out of opening 120P while in the condition illustrated in FIG. 19, set pieces 73A, 73B are quickly inserted into next opening 120P with the movement of unnecessary substrate 100B, as illustrated in FIG. 20. Thereby, while unnecessary substrate 100B is being conveyed, the conveyance passages of vertical frame portions 122X are less likely to shift inward before and after transverse frame portion 122Y goes up onto set pieces 73A, 73B.

Figure 21:
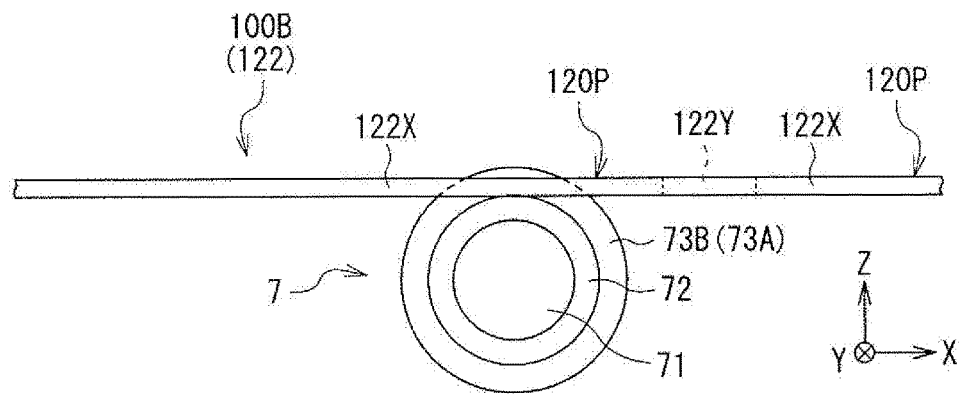
FIG. 21 is a plan view for explaining what relationship is between the unnecessary substrate and the auxiliary winding roller, which follows FIG. 20.

Eventually, as unnecessary substrate 100B further moves, the same condition as illustrated in FIG. 17, that is to say, the condition in which set pieces 73A, 73B are inserted in opening 120P, occurs again as illustrated in FIG. 21. Thus, the conveyance passages of vertical frame portions 122X become less likely to shift inward.

Along the conveyance passage of unnecessary substrate 100B between peel roller 4 and winding roller 6, the change in the conditions illustrated in FIGS. 17 to 21 is repeated while unnecessary substrate 100B is passing near auxiliary winding roller 7. The use of set pieces 73A, 73B makes the conveyance passages of vertical frame portions 122X less likely to shift inward.

<1-2-3. Function of Link Mechanism>

While unnecessary substrate 100B is being wound by winding roller 6, link mechanism 10 moves auxiliary winding roller 7 and presser roller 8 in the directions away from winding roller 6 with the increase in the winding diameter of unnecessary substrate 100B, as discussed below.

Whenever deemed necessary, FIGS. 1 to 8 and 13 to 16 are referred to for the following explanation.

Specifically, before unnecessary substrate 100B is wound by winding roller 6, main turn plates 12, 13 and secondary turn plate 14 tilt upward to the right, for example, as illustrated in FIGS. 5 and 6, since main turn plates 12, 13 and secondary turn plate 14 do not turn yet. Thereby, auxiliary winding roller 7 and presser roller 8 are situated closer to winding roller 6, for example, as illustrated in FIGS. 13 and 14.

In detail, since using the contractile action of biasing member 15, main turn plate 12 is lifted upward to be in contact with wall surface portion 11B, main turn plates 12, 13 tilt upward to the right. Thereby, presser roller 8 is lifted upward to be brought closer to winding roller 6, and thereby is pressed against winding roller 6. In other words, presser roller 8 is biased against winding roller 6.

Meanwhile, secondary turn plate 14 is lifted upward using elongation action of biasing member 16. Thus, like main turn plates 12, 13, secondary turn plate 14 tilts upward to the right. Thereby, auxiliary winding roller 7 is lifted upward to be brought closer to winding roller 6.

Under the condition that main turn plates 12, 13 and secondary turn plate 14 do not turn yet because unnecessary substrate 100B is not wound by winding roller 6, the tilt angle of main turn plates 12, 13 and the tilt angle of secondary turn plate 14 are equal to each other, for example. Nevertheless, the tilt angle of main turn plates 12, 13 and the tilt angle of secondary turn plate 14 may be unequal to each other.

While unnecessary substrate 100B is being continuously wound by winding roller 6, the winding diameter of unnecessary substrate 100B increases.

In this case, since as discussed above, presser roller 8 is biased against winding roller 6, presser roller 8 is pressed against unnecessary substrate 100B wound by winding roller 6.

Meanwhile, since as discussed above, auxiliary winding roller 7 is lifted upward to be brought closer to winding roller 6, auxiliary winding roller 7 is pressed against unnecessary substrate 100B. In other words, auxiliary winding roller 7 is biased against unnecessary substrate 100B. Thereby, as illustrated in FIG. 4, while unnecessary substrate 100B is passing near auxiliary winding roller 7, set pieces 73A, 73B are inserted into opening 120P.

With the increase in the winding diameter of unnecessary substrate 100B, unnecessary substrate 100B thus-wound presses presser roller 8 downward, and accordingly main turn plates 12, 13 turn each about pivot shaft 17 in the clockwise direction, for example, as illustrated in FIGS. 7 and 8. Thereby, while pressed against unnecessary substrate 100B, presser roller 8 moves along opening 2PB to leave away from winding roller 6, for example, as illustrated in FIGS. 1, 15 and 16.

In this case, in response to the turning action of main turn plates 12, 13, secondary turn plate 14 also turns about pivot shaft 17 in the clockwise direction, for example, as illustrated in FIGS. 7 and 8. Thereby, while pressed against unnecessary substrate 100B, auxiliary winding roller 7 moves along opening 2PA to leave away from winding roller 6, for example, as illustrated in FIGS. 1, 15 and 16. In other words, auxiliary winding roller 7 moves in conjunction with presser roller 8.

It should be noted that presser roller 8 is pressed against unnecessary substrate 100B which has been wound by winding roller 6, as illustrated in FIGS. 13 to 16. In contrast, auxiliary winding roller 7 is pressed against unnecessary substrate 100B which has not been wound by winding roller 6 yet, that is to say, unnecessary substrate 100B which is being conveyed between peel roller 4 and winding roller 6. Thereby, while unnecessary substrate 100B is being wound by winding roller 6, the position of auxiliary winding roller 7 can become lower than the position of presser roller 8.

In view of this, depending on the necessity, the movement distance of auxiliary winding roller 7 is adjusted to be greater than that of pressor roller 8 in order that auxiliary winding roller 7 can be fully pressed against unnecessary substrate 100B without affecting the conveyance conditions of unnecessary substrate 100B being conveyed to winding roller 6.

In detail, with the increase in the winding diameter of unnecessary substrate 100B wounded by winding roller 6, auxiliary winding roller 7 is pressed further downward by unnecessary substrate 100B in conveyance, and accordingly roller shaft 71 inserted in opening 12P moves downward in response to the turning action of main turn plates 12, 13, and simultaneously moves downward inside opening 12P in response to the turning action of secondary turn plate 14.

Thereby, the movement distance of auxiliary winding roller 7 becomes larger than that of pressor roller 8, and the position of auxiliary winding roller 7 accordingly becomes lower than that of pressor roller 8. In this condition, turn angle 81 of secondary turn plate 14 is greater than turn angle 82 of main turn plates 12, 13, as illustrated in FIGS. 7 and 8. Thus, as the winding diameter of unnecessary substrate 100B increases, secondary turn plate 14 tilts further downward to the right than main turn plates 12, 13.

Hence, the winding of unnecessary substrate 100B by winding roller 6 is achieved by: conveying unnecessary substrate 100B to winding roller 6 with set pieces 73A, 73B inserted into opening 120P by use of link mechanism 10; and winding thus-conveyed unnecessary substrate 100B by winding roller 6 while unnecessary substrate 100B is pressed against winding roller 6 by presser roller 8.

Thereby, without depending on the winding diameter of unnecessary substrate 100B, set pieces 73A, 73B are inserted into opening 120P, and unnecessary substrate 100B is pressed against winding roller 6 by presser roller 8.

1-3. Working and Effects

In the peeling apparatus, auxiliary winding roller 7 including set pieces 73A, 73B is arranged between peel roller 4 and winding roller 6. Thus, auxiliary winding roller 7 has steps D for preventing width W of opening 120P, which is provided to unnecessary substrate 100B, from being reduced. Accordingly, the peeling process is stably performed on laminate 100 for the following reasons.

Figure 22:
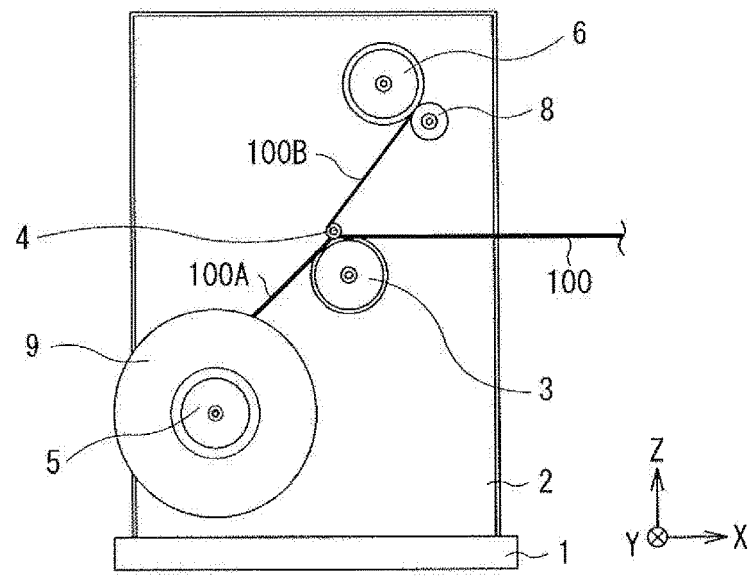
FIG. 22 is a plan view illustrating a configuration of a peeling apparatus of a comparative example.
Figure 23:
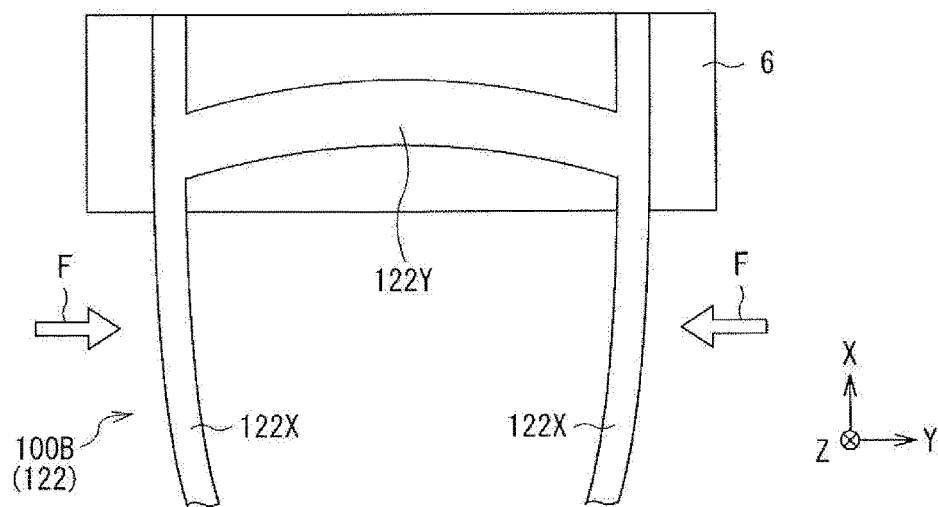
FIG. 23 is a plan view for explaining problems with the peeling apparatus of the comparative example.

FIG. 22 illustrates a configuration of a peeling apparatus of a comparative example, which is a plan configuration corresponding to the plan configurations of FIGS. 13 and 15. FIG. 23 illustrates plan configurations of winding roller 6 and unnecessary substrate 100B during the winding of unnecessary substrate 100B by winding roller 6 for the purpose of explaining problems with the peeling apparatus of the comparative example.

The peeling apparatus of the comparative example has the same configuration as the peeling apparatus of the embodiment, except that the peeling apparatus of the comparative example does not include auxiliary winding roller 7. Like the peeling apparatus of the embodiment, the peeling apparatus of the comparative example performs a peeling process on laminate 100. Specifically, as illustrated in FIG. 22, laminate 100 conveyed by conveyance roller 3 is separated into necessary substrate 100A and unnecessary substrate 100B using peel roller 4. Necessary substrate 100A is wound by winding roller 5, and unnecessary substrate 100B is wound by winding roller 6 while pressed by presser roller 8.

However, unnecessary substrate 100B is less likely to be normally wound by winding roller 6 because of being influenced by a structural factor of unnecessary substrate 100B, as illustrated in FIG. 23, while unnecessary substrate 100B is being conveyed between peel roller 4 and winding roller 6.

Specifically, while unnecessary substrate 100B is being conveyed between peel roller 4 and winding roller 6, tensile force is applied to unnecessary substrate 100B in order that unnecessary substrate 100B can be easily wound by winding roller 6. In this case, in the vicinity of opening 120P in unnecessary substrate 100B, the tensile force concentrates on two vertical frame portions 122X due to the structural factor of unnecessary substrate 100B with opening 120P. This unexpectedly causes inward force F which works on unnecessary substrate 100B. Thus, the conveyance passages of vertical frame portions 122X become more likely to shift inward, and transverse frame portion 122Y becomes more likely to be lifted. For these reasons, width W of opening 120P unexpectedly becomes more likely to narrow.

If the conveyance passages of vertical frame portions 122X shifts inward, vertical frame portions 122X become more likely to be folded over while unnecessary substrate 100B is being wound by winding roller 6. Meanwhile, if transverse frame portion 122Y is lifted, transverse frame portion 122Y becomes more likely to be folded over while unnecessary substrate 100B is being wound by winding roller 6. As a result, unnecessary substrate 100B is unevenly wound by winding roller 6. Accordingly, the tensile force on unnecessary substrate 100B unexpectedly becomes more likely to increase.

Thus, if the unexpectedly increased tensile force on unnecessary substrate 100B concentrates on vertically-long vertical frame portions 122X, vertical frame portions 122X become more likely to break apart since vertical frame portions 122X are excessively pulled in the conveyance condition of unnecessary substrate 100B. Once vertical frame portions 122X break apart, unnecessary substrate 100B is no longer wound by winding roller 6. As a result, the peeling process can no longer be performed on laminate 100. This makes it difficult to stably perform the peeling process on laminate 100 in the case where unnecessary substrate 100B includes opening 120P.

In contrast to this, in the peeling apparatus of the embodiment, auxiliary winding roller 7 including set pieces 73A, 73B for forming steps D is arranged between peel roller 4 and winding roller 6, as illustrated in FIGS. 3, 4 and 13 to 16.

In this case, set pieces 73A, 73B are inserted into opening 120P, as illustrated in FIG. 4, while unnecessary substrate 100B is being conveyed between peel roller 4 and winding roller 6. Thereby, set piece 73A is brought into contact with one vertical frame portion 122X from inside, and therefore, the conveyance passages of the one vertical frame portion 122X becomes less likely to shift inward even if inward force F occurs. Meanwhile, set piece 73B is brought into contact with the other vertical frame portion 122X from inside, and therefore, the conveyance passages of the other vertical frame portion 122X becomes less likely to shift inward even if inward force F occurs. In addition, since two vertical frame portions 122X become less likely to shift inward, transverse frame portion 122Y becomes less likely to be lifted.

Thus, width W of opening 120P is restrained from narrowing while unnecessary substrate 100B is being wound by winding roller 6. In this case, vertical frame portions 122X become less likely to be excessively pulled in the conveyance condition of unnecessary substrate 100B, and therefore, vertical frame portions 122X become less likely to break apart. Thereby, unnecessary substrate 100B is continuously wound by winding roller 6. Hence, the peeling process can be stably performed on laminate 100 even if unnecessary substrate 100B includes opening 120P.

In addition to the above advantages, the following advantages can be obtained.

Firstly, in the case where auxiliary winding roller 7 is biased against unnecessary substrate 100B using link mechanism 10, set pieces 73A, 73B are easily inserted into opening 120P. Thus, the shift in the conveyance passages of vertical frame portions 122X is easily inhibited using set pieces 73A, 73B. Accordingly, a higher effect can be obtained.

Secondly, in the case where auxiliary winding roller 7 is movable in the direction away from winding roller 6 with the increase in the winding diameter of unnecessary substrate 100B wound by winding roller 6, the winding of unnecessary substrate 100B by winding roller 6 is less likely to be hindered despite the use of auxiliary winding roller 7. Thus, it is possible to continuously wind unnecessary substrate 100B using winding roller 6 while inhibiting the shift of the conveyance passage of vertical frame portions 122X using set pieces 73A, 73B. Accordingly, a higher effect can be obtained.

Thirdly, in the case where laminate 100 includes release substrate 110 and seal substrate 120 (label portions 121 and non-label portion 122), the peeling process can be stably performed on laminate 100 which is a so-called label type of seal. Thereby, necessary parts (release substrate 110 and necessary substrate 100A including label portions 121) can be stably selected from laminate 100.

1-4. Modifications

As discussed below, the configuration of the peeling apparatus can be modified depending on the necessity. Incidentally, arbitrary two or more of the below-discussed modifications may be combined.

[Modification 1]

Figure 24:
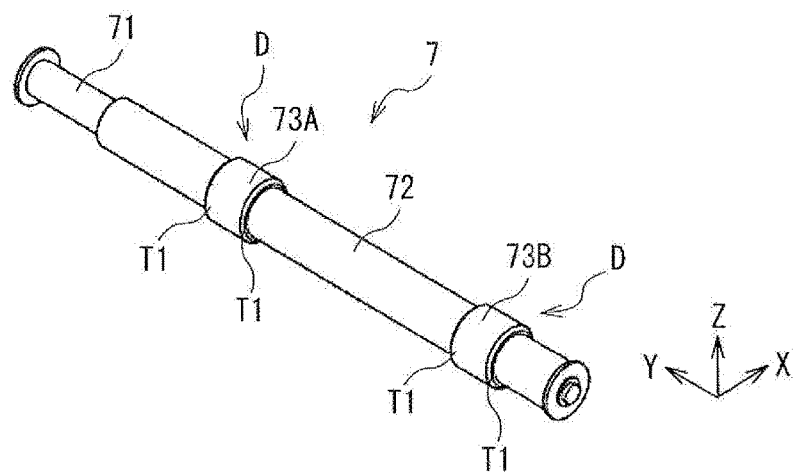
FIG. 24 is a perspective view illustrating a first modification of the configuration of the auxiliary winding roller.
Figure 25:
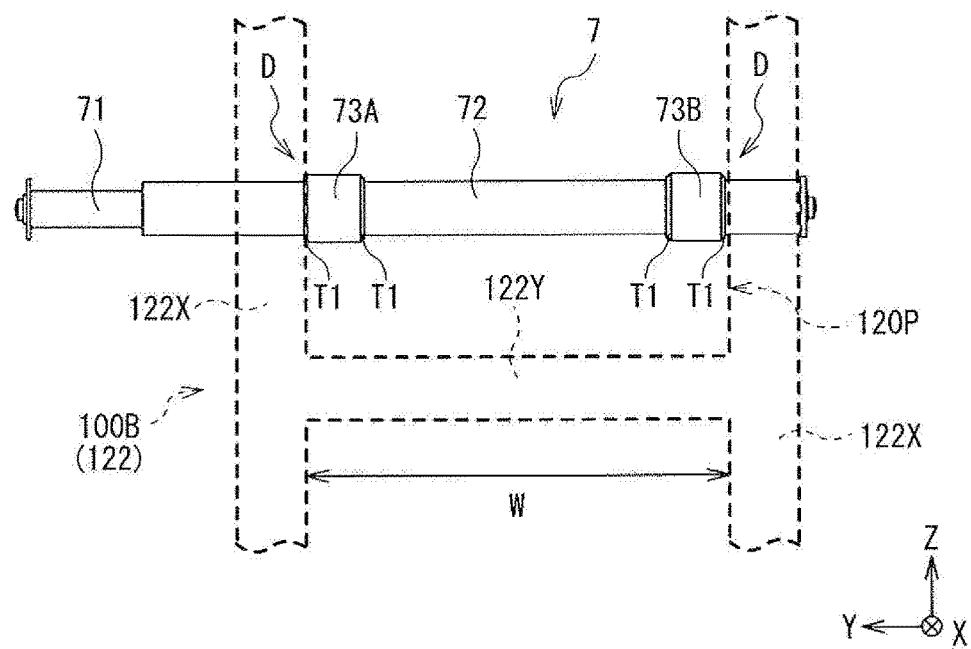
FIG. 25 is a plan view illustrating a configuration of the auxiliary winding roller illustrated in FIG. 24.

For example, set pieces 73A, 73B may be each provided with flat taper surfaces T1, as illustrated in FIG. 24 corresponding to FIG. 3, and FIG. 25 corresponding to FIG. 4. FIGS. 24 and 25 illustrate a case where: for example, inner and outer end portions of set piece 73A are each provided with taper surface T1; and inner and outer end portions of set piece 73B are each provided with taper surface T1. The width (Y-direction dimension) of taper surface T1 may be set arbitrarily.

In the case where the outer end portion of set piece 73A is provided with taper surface T1, the outer end portion thereof inclines such that the outer diameter of set piece 73A becomes gradually smaller toward the outside. In this case, even if vertical frame portion 122X unexpectedly goes up onto set piece 73A due to an excessive increase in the tensile force on unnecessary substrate 100B, vertical frame portion 122X easily slides down from set piece 73A using taper surface T1 (slope). In other words, even if the conveyance passage of vertical frame portion 122X unexpectedly shifts inward due to excessive tensile force, the conveyance passage of vertical frame portion 122X easily returns to normalcy. Thus, the peeling process can be stably performed on laminate 100.

The same advantage as obtained in the case where the outer end portion of set piece 73A is provided with taper surface T1 can be obtained in the case where the outer end portion of set piece 73B is provided with taper surface T1.

Meanwhile, in the case where the inner end portion of set piece 73A is provided with taper surface T1, the inner end portion thereof inclines such that the outer diameter of set piece 73A becomes gradually smaller toward the inside. In this case, even if vertical frame portion 122X unexpectedly goes over set piece 73A due to excessive tensile, vertical frame portion 122X easily comes back over set piece 73A using taper surface T1 (slope). In other words, even if the conveyance passage of vertical frame portion 122X unexpectedly shifts inward to a large extent due to excessive tensile force, the conveyance passage of vertical frame portion 122X easily return to normalcy. Thus, the peeling process can be stably performed on laminate 100.

The same advantage as obtained in the case where the inner end portion of set piece 73A is provided with taper surface T1 can be obtained in the case where the inner end portion of set piece 73B is provided with taper surface T1.

It should be noted that although in FIGS. 24 and 25, the outer and inner end portions of set piece 73A are each provided with taper surface T1, only the outer end portion thereof may be provided with taper surface T1, or only the inner end portion thereof may be provided with taper surface T1. Similarly, although the outer and inner end portions of set piece 73B are each provided with taper surface T1, only the outer end portion thereof may be provided with taper surface T1, or only the inner end portion thereof may be provided with taper surface T1.

Although in FIGS. 24 and 25, set pieces 73A, 73B are each provided with taper surfaces T1, it is a matter of course that only set piece 73A is provided with taper surfaces T1, or only set piece 73B is provided with taper surfaces T1.

[Modification 2]

Figure 26:
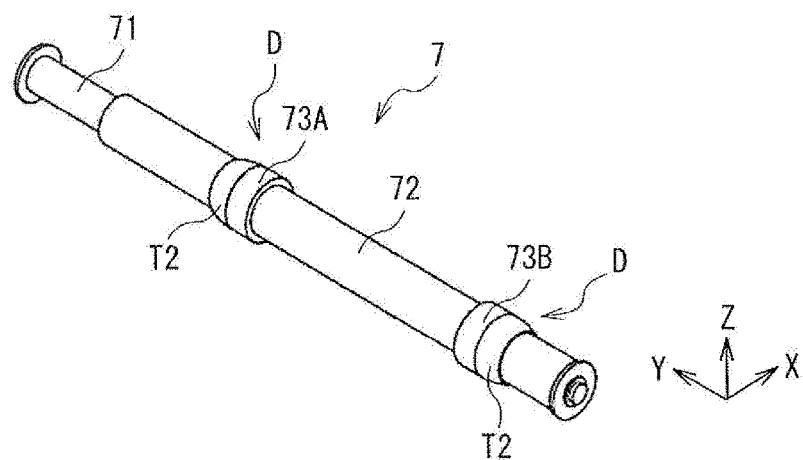
FIG. 26 is a perspective view illustrating a second modification of the configuration of the auxiliary winding roller.
Figure 27:
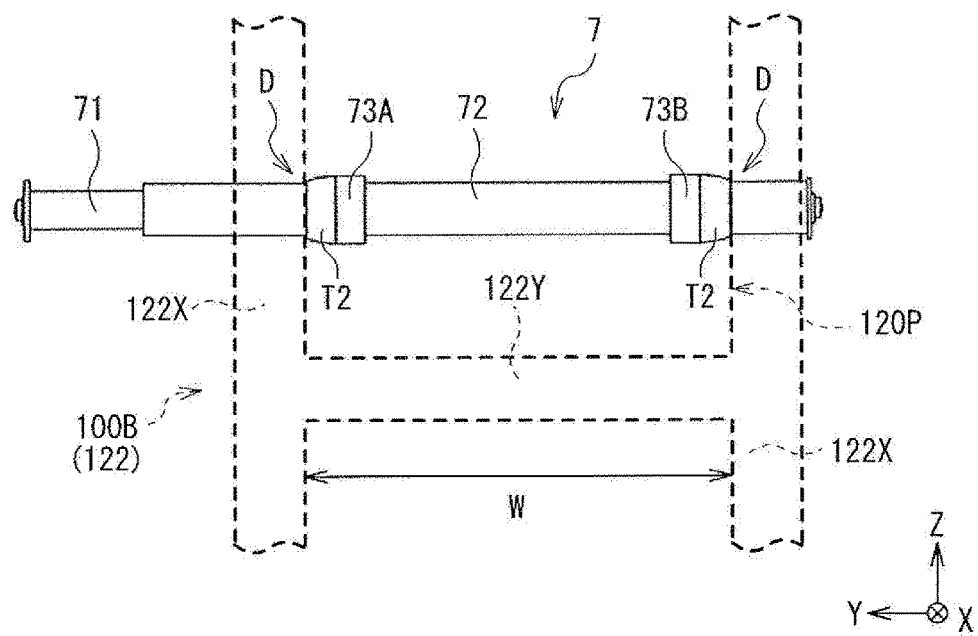
FIG. 27 is a plan view illustrating a configuration of the auxiliary winding roller illustrated in FIG. 26.

For example, set pieces 73A, 73B may be each provided with curved taper surfaces T2, as illustrated in FIG. 26 corresponding to FIG. 3, and FIG. 27 corresponding to FIG. 4. FIGS. 26 and 27 illustrate a case where: for example, the outer end portion of set piece 73A is provided with taper surface T2; and the outer end portion of set piece 73B is provided with taper surface T2. The width (Y-direction dimension) of taper surface T2 may be set arbitrarily.

Taper surface T2 may be curved to project upward, or may be curved to dent downward. FIGS. 26 and 27 illustrate a case where taper surface T2 is curved to project upward, for example.

In the case where the outer end portion of set piece 73A is provided with taper surface T2, the outer end portion thereof inclines such that the outer diameter of set piece 73A becomes gradually smaller toward the outside. Thereby, like in the case of using taper surface T1, even if vertical frame portion 122X goes up onto set piece 73A, vertical frame portion 122X easily slides down from set piece 73A using taper surface T2 (slope). Accordingly, the conveyance passage of vertical frame portion 122X easily returns to the normal passage. Thus, the peeling process can be stably performed on laminate 100.

The same advantage as obtained in the case where the outer end portion of set piece 73A is provided with taper surface T2 can be obtained in the case where the outer end portion of set piece 73B is provided with taper surface T2.

It should be noted that although in FIGS. 26 and 27, only the outer end portion of set piece 73A is provided with taper surface T2, only the inner end portion thereof may be provided with taper surface T2, or the outer and inner end portion thereof may be each provided with taper surface T2. Similarly, although in FIGS. 26 and 27, only the outer end portion of set piece 73B is provided with taper surface T2, only the inner end portion thereof may be provided with taper surface T2, or the outer and inner end portion thereof may be each provided with taper surface T2.

In the case where the inner end portion of set piece 73A is provided with taper surface T2, the inner end portion thereof inclines such that the outer diameter of set piece 73A becomes gradually smaller toward the inside. Thereby, like in the case of using taper surface T1, even if vertical frame portion 122X unexpectedly goes over set piece 73A, vertical frame portion 122X easily comes back over set piece 73A using taper surface T2 (slope). Accordingly, the conveyance passage of vertical frame portion 122X easily returns to the normal passage. Thus, the peeling process can be stably performed on laminate 100. The same advantage as obtained in the case where the inner end portion of set piece 73A is provided with taper surface T2 can be obtained in the case where the inner end portion of set piece 73B is provided with taper surface T2.

Although in FIGS. 26 and 27, set pieces 73A, 73B are each provided with taper surfaces T2, it is a matter of course that only set piece 73A is provided with taper surfaces T2, or only set piece 73B is provided with taper surfaces T2.

[Modification 3]

Figure 28:
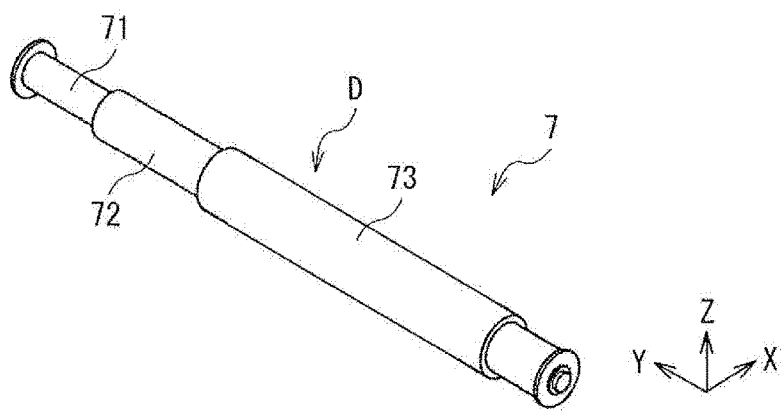
FIG. 28 is a perspective view illustrating a third modification of the configuration of the auxiliary winding roller.
Figure 29:
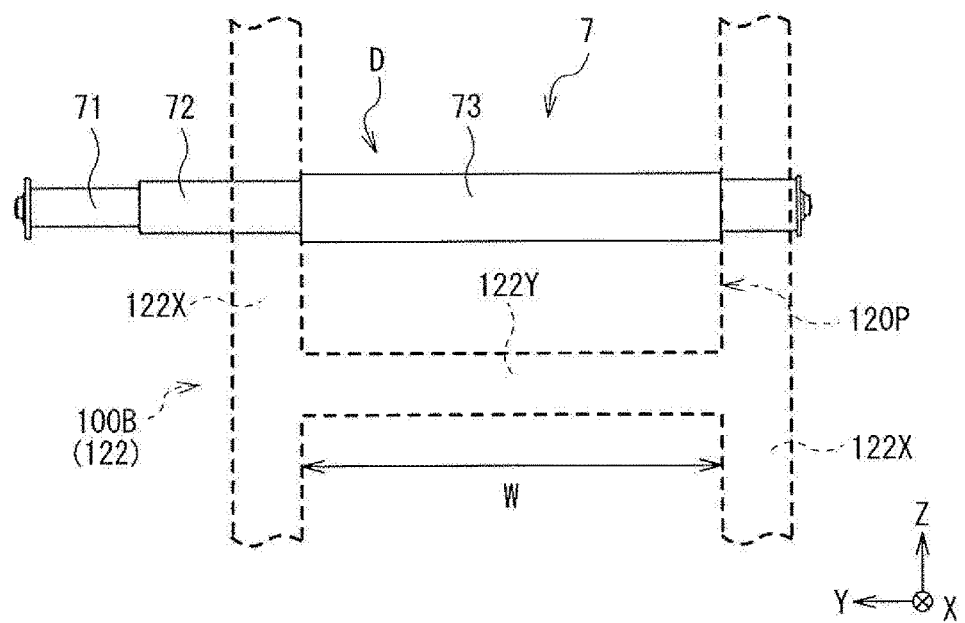
FIG. 29 is a plan view illustrating a configuration of the auxiliary winding roller illustrated in FIG. 28.

For example, auxiliary winding roller 7 may include a single wide set piece 73 instead of two narrow set pieces 73A, 73B, as illustrated in FIG. 28 corresponding to FIG. 3, and FIG. 29 corresponding to FIG. 4. Like set pieces 73A, 73B, set piece 73 is a projection portion used to restrain the narrowing of width W of opening 120P. In this case, too, set piece 73 is inserted into opening 120P, and is brought into contact with vertical frame portions 122X. Thereby, the conveyance passages of vertical frame portions 122X become less likely to shift inward. Accordingly, the same effect as obtained in the case of using set pieces 73A, 73B can be obtained from the use of set piece 73.

The use of single wide set piece 73, however, raises a need to replace auxiliary winding roller 7 or set piece 73 when unnecessary substrate 110B including opening 120 with changed width W is used, because set piece 73 with a width corresponding to changed width W needs to be used instead. For this reason, it is desirable that two set pieces 73A, 73B whose positions are changeable depending on width W of opening 120P be used in order to eliminate work of replacing auxiliary winding roller 7 or set piece 73.

[Modification 4]

Figure 30:
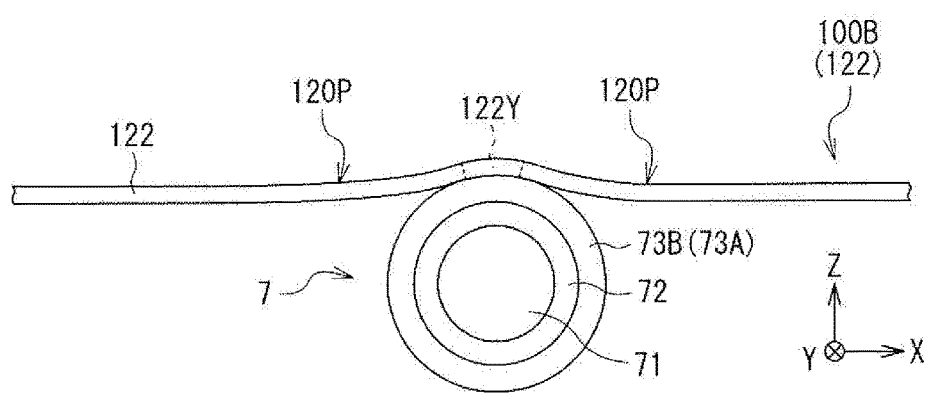
FIG. 30 is a plan view for explaining concerns about the auxiliary winding roller.

As illustrated in FIG. 30 corresponding to FIGS. 17 to 21, in a case where the width (X-direction dimension) of transverse frame portion 122Y is narrow, even if auxiliary winding roller 7 is used, a situation is more likely to occur in which: such transverse frame portion 122Y goes up onto set pieces 73A, 73B; and set pieces 73A, 73B go out of opening 120P. In this situation, the conveyance passage of vertical frame portions 122X may shift inward.

Figure 31:
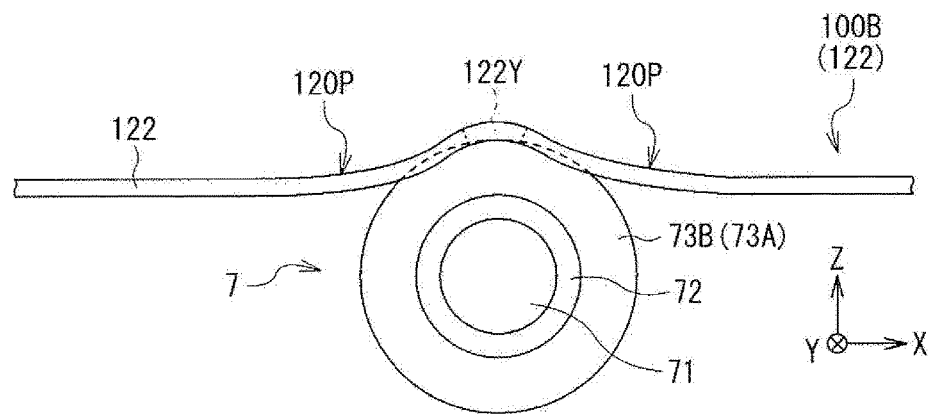
FIG. 31 is a perspective view illustrating a fourth modification of the configuration of the auxiliary winding roller.

In view of this, as illustrated in FIG. 31 corresponding to FIG. 30, the outer diameters of set pieces 73A, 73B may be made larger. The outer diameters of set pieces 73A, 73B may be set arbitrarily.

In this case, even if transverse frame portion 122Y with a narrow width goes up onto part of set piece 73A, the other part of set piece 73A is more likely to be inserted into two openings 120P located upstream and downstream of transverse frame portion 122Y. If even only part of set piece 73A is inserted in opening 120P, the conveyance passages of vertical frame portion 122X is less likely to shift inward than in a case where no part of set piece 73A is inserted in opening 120P at all. Similarly, if even only part of set piece 73B is inserted in opening 120P, the conveyance passages of vertical frame portion 122X is less likely to shift inward. These make the situation less likely to occur in which: transverse frame portion 122Y goes up onto set pieces 73A, 73B; and set pieces 73A, 73B go out of opening 120P. Furthermore, even if a situation occurs in which set pieces 73A, 73B go out of opening 120P, a length of time for which set pieces 73A, 73B remain out of opening 120P is sufficiently short. Thus, the likelihood that vertical frame portions 122X shift inward decreases. Accordingly, a higher effect can be obtained.

[Modification 5]

Albeit not illustrated specifically, the number of combinations (the number of sets) of set pieces 73A, 73B can be changed depending on the configuration of unnecessary substrate 100B (the number of openings 120P) and the like, as long as the shift of the conveyance passages of vertical frame portions 122X can be inhibited by use of set pieces 73A, 73B.

Specifically, in the case illustrated in FIG. 4, since the number of openings 120P arranged in the direction (X direction) intersecting the conveyance condition of unnecessary substrate 100B (the number of arrays) is 1, one set of set pieces 73A, 73B are used to inhibit the conveyance passages of vertical frame portions 122X from shifting inward.

However, the number of sets of set pieces 73A, 73B may be changed depending on the number of arrays of openings 120P. Specifically, for example, in a case where the number of arrays of openings 120P is 2, two sets of set pieces 73A, 73B in total may be used by combining: one set of set pieces 73A, 73B to be inserted into one opening 120P; and one set of set pieces 73A, 73B to be inserted into the other opening 120P. Furthermore, for example, in a case where the number of arrays of openings 120P is 3, three sets of set pieces 73A, 73B in total may be used by combining: one set of set pieces 73A, 73B to be inserted into a first opening 120P; one set of set pieces 73A, 73B to be inserted into a second opening 120P; and one set of set pieces 73A, 73B to be inserted into a third opening 120P. In these cases, too, the conveyance passages of vertical frame portions 122X are less likely to shift. Accordingly, the same effect can be obtained.

In the case illustrated in FIG. 29, too, the number of sets of set pieces 73A, 73B may be changed depending on the number of arrays of openings 120P, as discussed above. Specifically, for example, in a case where the number of arrays of openings 120P is 2, two set pieces 73 in total may be used by combining: one set piece 73 to be inserted into one opening 120P; and one set piece 73 to be inserted into the other opening 120P. Furthermore, for example, in a case where the number of arrays of openings 120P is 3, three set pieces 73 in total may be used by combining: one set piece 73 to be inserted into a first opening 120P; one set piece 73 to be inserted into a second opening 120P; and one set piece 73 to be inserted into a third opening 120P. In these cases, too, the conveyance passages of vertical frame portions 122X are less likely to shift. Accordingly, the same effect can be obtained.

2. Peeling Apparatus (Second Embodiment)

Descriptions are provided for a peeling apparatus of a second embodiment.

<2-1. Configuration>

A peeling apparatus of this embodiment has the same configuration as the peeling apparatus of the first embodiment, except that the peeling apparatus of this embodiment includes auxiliary winding roller 170 instead of auxiliary winding roller 7. The following descriptions are provided by citing the components of the peeling apparatus of the first embodiment whenever deemed necessary.

Figure 32:
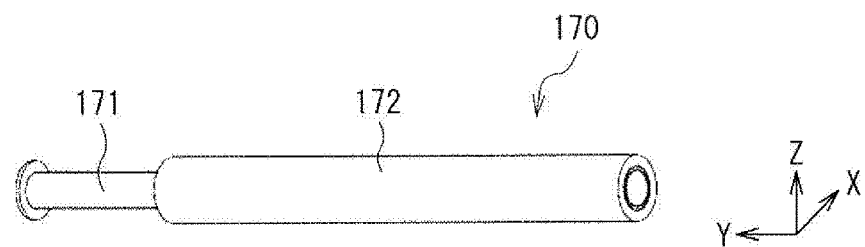
FIG. 32 is a perspective view illustrating a configuration of a main part (auxiliary winding roller) in a peeling apparatus of a second embodiment.

FIG. 32 illustrates a perspective configuration of a main part (auxiliary winding roller 170) in the peeling apparatus in this embodiment. Auxiliary winding roller 170 has the same configuration as auxiliary winding roller 7, except for what are described below.

As discussed above, unnecessary substrate 100B to be wound by winding roller 6 includes openings 120P (with width W) (see FIG. 12). To accommodate this, auxiliary winding roller 170 has steps D in order to perform the function as auxiliary winding roller 7 does (restrain width W of openings 120 from narrowing).

In auxiliary winding roller 7, however, steps D are formed regardless of whether or not unnecessary substrate 100B is pressed against auxiliary winding roller 7. In other words, steps D are already formed therein before auxiliary winding roller 7 is pressed against unnecessary substrate 100B. In contrast to this, in auxiliary winding roller 170, steps D are formed only when unnecessary substrate 100B is pressed against auxiliary winding roller 170, unlike in auxiliary winding roller 7. In other words, before auxiliary winding roller 170 is pressed against unnecessary substrate 100B, no steps D are formed therein; and only after auxiliary winding roller 170 is pressed against unnecessary substrate 100B, steps D are formed therein.

Specifically, auxiliary winding roller 170 includes roller shaft 171 and roller main body 172, for example, as illustrated in FIG. 32.

Roller shaft 171 has a three-dimensional cylinder-like shape, extending in a direction (Y direction), which is the same as the extension direction of auxiliary winding roller 170. Like roller shaft 71, one end portion of roller shaft 171 is fixed to link mechanism 10.

Roller main body 172 is a ring-shaped member extending in the same direction as roller shaft 171 extends, and covering part of the outer peripheral surface of roller shaft 171. Roller main body 172 has an outer diameter which is larger than that of roller shaft 171, and is rotatable about the center (axis of rotation) of roller shaft 171.

Particularly, roller main body 172 contains, for example, any one, two or more of elastic materials such as sponge with a high foaming rate, and soft rubber with low hardness. For this reason, roller main body 172 is deformable when unnecessary substrate 100B is pressed against roller main body 172.

Specifically, for example, once unnecessary substrate 100B is pressed against roller main body 172, roller main body 172 can be partially recessed in its portions against which unnecessary substrate 100B is pressed. In other words, recesses 173 (see FIGS. 33 to 36) are formable in response to the pressing of unnecessary substrate 100B against roller main body 172.

Furthermore, for example, once unnecessary substrate 100B having been pressed against roller main body 172 is separated from roller main body 172, roller main body 172 is capable of partially restoring its shape in its portions against which unnecessary substrate 100B have been pressed. In other words, recesses 173 are capable of disappearing when roller main body 172 of unnecessary substrate 100B pressed against roller main body 172 is removed from roller main body 172.

2-2. Operation

The peeling apparatus of this embodiment operates in the same way as the peeling apparatus of the first embodiment does, except for the way discussed below.

FIGS. 33 to 36 illustrate a perspective configuration of auxiliary winding roller 170, and a respective configuration of unnecessary substrate 100B which is pressed against auxiliary winding roller 170, for the purpose of explaining how the peeling apparatus works. FIGS. 33 to 36 correspond to FIG. 32.

Figure 33:
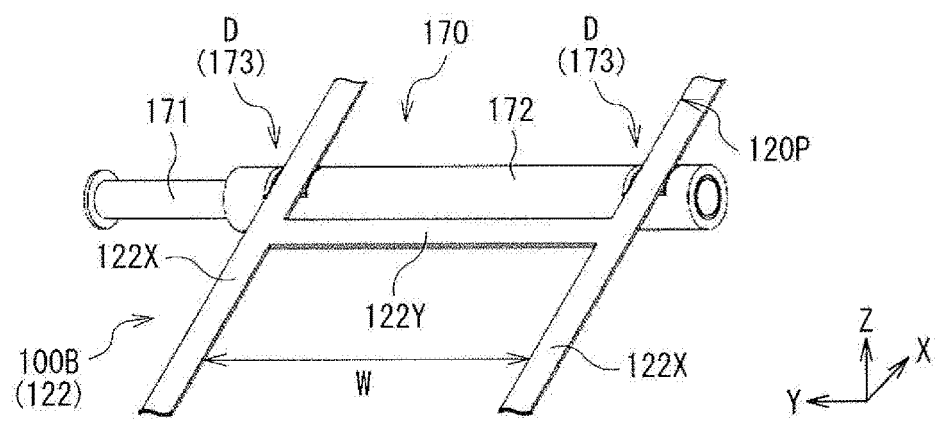
FIG. 33 is a perspective view for explaining how the peeling apparatus works (what relationship is between vertical frame portions and the auxiliary winding roller).
Figure 34:
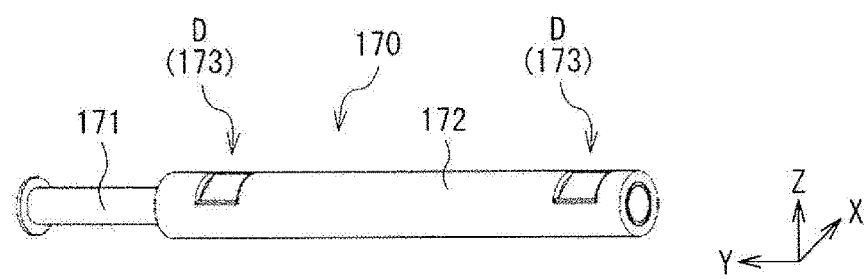
FIG. 34 is a perspective view for explaining how the peeling apparatus works (what configuration the auxiliary winding roller has while the vertical frame portions are being pressed against the auxiliary winding roller).

Note that for the purpose of explaining what relationship is between vertical frame portions 122X and auxiliary winding roller 170, FIG. 33 illustrates how vertical frame portions 122X are pressed against auxiliary winding roller 170. For the purpose of making it easy to see a configuration which auxiliary winding roller 170 has while vertical frame portions 122X are being pressed against auxiliary winding roller 170, FIG. 34 illustrates auxiliary winding roller 170 with vertical frame portions 122X removed therefrom.

Figure 35:
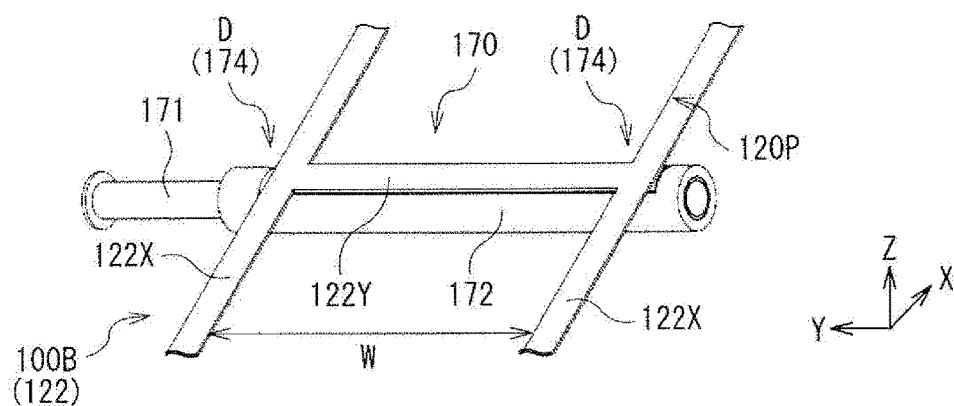
FIG. 35 is a perspective view for explaining how the peeling apparatus works (what relationship is between a transverse frame portion and the auxiliary winding roller).
Figure 36:
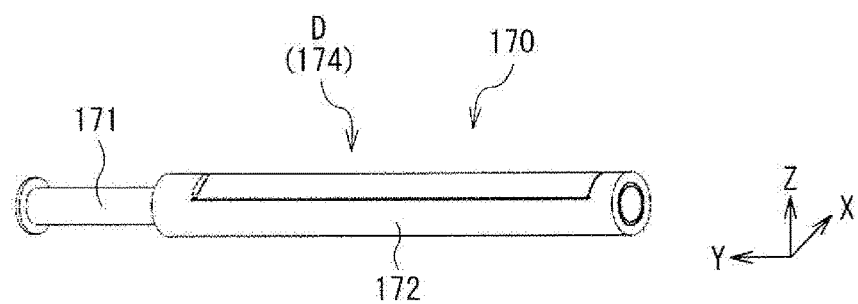
FIG. 36 is a perspective view for explaining how the peeling apparatus works (what configuration the auxiliary winding roller has while the transverse frame portion is being pressed against the auxiliary winding roller).

Besides, for the purpose of explaining what relationship is between transverse frame portion 122Y and auxiliary winding roller 170, FIG. 35 illustrates how transverse frame portion 122Y is pressed against auxiliary winding roller 170. For the purpose of making it easy to see a configuration which auxiliary winding roller 170 has while transverse frame portion 122Y is being pressed against auxiliary winding roller 170, FIG. 36 illustrates auxiliary winding roller 170 with transverse frame portion 122Y removed therefrom.

In this peeling apparatus, while unnecessary substrate 100B is being wound by winding roller 6, auxiliary winding roller 170 inhibits abnormality from occurring due to the winding, like auxiliary winding roller 7.

Specifically, while unnecessary substrate 100B is not being wound by winding roller 6, no steps D are formed in roller main body 172, as illustrated in FIG. 32, since unnecessary substrate 100B is not pressed against roller main body 172.

Meanwhile, once unnecessary substrate 100B is wound by winding roller 6, unnecessary substrate 100B is pressed against roller main body 172, as illustrated in FIGS. 33 to 36. Thereby, steps D are formed in parts of roller main body 172 against which unnecessary substrate 100B is pressed.

Specifically, as illustrated in FIGS. 33 and 34, once two vertical frame portions 122X are pressed against roller main body 172, roller main body 172 is partially recessed in its parts against which two vertical frame portions 122X are pressed. Thereby, two recesses 173 are formed. In other words, two steps D are formed in auxiliary winding roller 170 using two recesses 173.

Two recesses 173 are two recess portions used to accommodate two vertical frame portions 122X in its inside, and to thereby restrain width W of opening 120P from unexpectedly narrowing, while unnecessary substrate 100B is being wound by winding roller 6. In this case, while unnecessary substrate 100B is passing near auxiliary winding roller 170, one vertical frame portion 122X is fitted into one recess 173, and the other vertical frame portion 122X is fitted into the other recess 173.

Thereby, one vertical frame portion 122X is accommodated into one recess 173. Thus, while unnecessary substrate 100B is being conveyed to winding roller 6 via auxiliary winding roller 170, the conveyance passage of one vertical frame portion 122X is less likely to shift inward of one recess 173 (rightward in FIGS. 33 and 34). Meanwhile, the other vertical frame portion 122X is accommodated into the other recess 173. Thus, while unnecessary substrate 100B is being conveyed to winding roller 6 via auxiliary winding roller 170, the conveyance passage of the other vertical frame portion 122X is less likely to shift inward of the other recess 173 (leftward in FIGS. 33 and 34).

Furthermore, as illustrated in FIGS. 35 and 36, once transverse frame portion 122Y is pressed against roller main body 172 with conveyance of unnecessary substrate 1106, roller main body 172 is partially recessed in its part against which transverse frame portion 122Y is pressed. Thereby, recess 174 is formed. In other words, one step D is formed in auxiliary winding roller 170 using recess 174.

Recess 174 is used to accommodate transverse frame portion 122Y in its inside, and to thereby prevent the shift in the conveyance passage of unnecessary substrate 100B, while unnecessary substrate 100B is being wound by winding roller 6. In this case, while unnecessary substrate 100B is passing near auxiliary winding roller 170, transverse frame portion 122Y is fitted into recess 174.

Thereby, transverse frame portion 122Y is accommodated into recess 174. Thus, while unnecessary substrate 100B is being conveyed to winding roller 6 via auxiliary winding roller 170, the conveyance passage of unnecessary substrate 100B is less likely to shift when transverse frame portion 122Y passes near auxiliary winding roller 170.

During the conveyance of unnecessary substrate 100B, it is possible to repeatedly obtain the advantage that, as discussed above, the use of two recesses 173 makes the conveyance passages of vertical frame portions 122X less likely to shift, and the use of one recess 174 makes the conveyance passage of unnecessary substrate 100B (transverse frame portion 122Y) less likely to shift.

As discussed above, recesses 173, 174 are formed in places against which unnecessary substrate 100B is pressed. Thus, in places from which unnecessary substrate 100B leaves away with the rotation of roller main body 172, roller main body 172 changes its shape again (restores its shape) to make recesses 173, 174 disappear using its elastic deformation. Thereby, recesses 173, 174 disappear. The forming and erasing of recesses 173, 174 is repeated in response to the rotation of roller main body 172.

It is a matter of course that once unnecessary substrate 100B is removed from the peeling apparatus after the completion of the peeling process using the peeling apparatus, roller main body 172 changes its shape again (restores its shape) to make recesses 173, 174 disappear using its elastic deformation, as illustrated in FIG. 32. Thereby, recesses 173, 174 disappear.

2-3. Working and Effects

In the peeling apparatus of this embodiment, auxiliary winding roller 170 including roller main body 172 (elastic material) is arranged between peel roller 4 and winding roller 6. Thereby, recesses 173 are formed when unnecessary substrate 100B (vertical frame portions 122X) is pressed against auxiliary winding roller 170. Thus, steps D for restraining the narrowing of width W of opening 120P provided to unnecessary substrate 100B are formed.

In this case, as discussed above, while vertical frame portions 122X are passing near auxiliary winding roller 170, vertical frame portions 122X are fitted into recesses 173. Thus, the conveyance passages of vertical frame portions 122X are less likely to shift inward or outward. Thereby, while unnecessary substrate 100B is being wound by winding roller 6, the narrowing of width W of opening 120P is restrained. Hence, vertical frame portions 122X are less likely to break apart for the same reason as discussed in the first embodiment. Accordingly, unnecessary substrate 100B is continuously wound by winding roller 6. For this reason, the peeling process can be stably performed on laminate 100 even if unnecessary substrate 100B has opening 120P.

Particularly, while transverse frame portion 122Y is passing near auxiliary winding roller 170, transverse frame portion 122Y is fitted into recess 174. Thus, the conveyance passage of transverse frame portion 122Y is also less likely to shift inward or outward. Thereby, the conveyance passages of vertical frame portions 122X are much less likely to shift. For this reason, the peeling process can be stably performed on laminate 100.

Furthermore, in a case where auxiliary winding roller 170 is biased against unnecessary substrate 100B using link mechanism 10, unnecessary substrate 100B becomes easier to press against auxiliary winding roller 170, and therefore, recesses 173, 174 become easier to form in auxiliary winding roller 170. This makes it easier to inhibit the shifting in the conveyance passages of vertical frame portions 122X using recesses 173, and to inhibit the shifting in the conveyance passage of transverse frame portion 122Y using recess 174. Accordingly, a higher effect can be obtained.

It should be noted that the other working and effects of the peeling apparatus of this embodiment are the same as those of the peeling apparatus of the first embodiment.

2-4. Modifications

Figure 37:
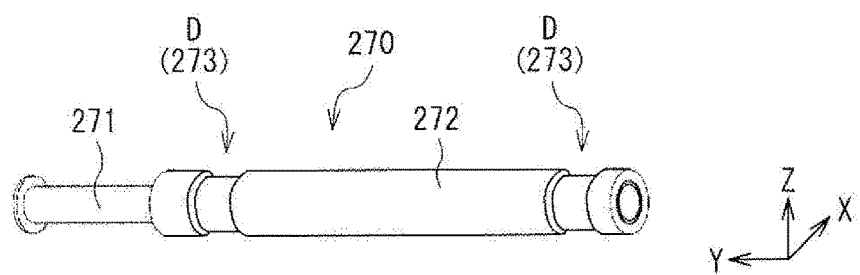
FIG. 37 is a perspective view illustrating a modification of the auxiliary winding roller.

For example, as illustrated in FIG. 37 corresponding to FIG. 32, auxiliary winding roller 270 may be used instead of auxiliary winding roller 170. Two steps D (two recesses 273) are formed in auxiliary winding roller 270 in advance, unlike in auxiliary winding roller 170 in which steps D (recesses 173, 174) are formed only after unnecessary substrate 100B is pressed against auxiliary winding roller 170. Like two recesses 173, two recesses 273 are recess portions used to restrain the narrowing of width W of opening 120P.

Specifically, auxiliary winding roller 270 includes roller shaft 271 and roller main body 272, for example, as illustrated in FIG. 37. Roller shaft 271 has, for example, the same configuration as roller shaft 171. Roller main body 272 has, for example, the same configuration as roller main body 172, except that: roller main body 272 contains a material with rigidity; and roller main body 272 includes two recesses 273 into which to fit two vertical frame portions 122X. Recesses 273 are formed along the outer peripheral surface of roller main body 272 regardless of whether or not unnecessary substrate 100B is pressed, unlike recesses 173, 174 which are repeatedly formed and disappear in response to whether or not unnecessary substrate 100B is pressed.

In this case, too, the conveyance passages of two vertical frame portions 122X are less likely to shift inward or outward, since two vertical frame portions 122X are fitted into two recesses 273. Accordingly, the same effect can be obtained.

The use of auxiliary winding roller 270, however, raises a need to replace auxiliary winding roller 270 when unnecessary substrate 110B including opening 120P with changed width W is used, because auxiliary winding roller 270 inclusive of two recesses 273 respectively in its parts corresponding to changed width W needs to be used instead. Furthermore, there is likelihood that the conveyance passage of unnecessary substrate 100B shifts, because while traverse frame portion 122Y is passing near auxiliary winding roller 270, traverse frame portion 122Y is not fitted into recesses 273. For this reason, it is desirable that auxiliary winding roller 170 be used instead of auxiliary winding roller 270 in order to eliminate work of replacing auxiliary winding roller 270, and to inhibit the shift in the conveyance passage of unnecessary substrate 100B.

Although the invention has been described citing the embodiments, the invention is not limited to the modes which have been discussed in the embodiments, and can be modified variously.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A peeling apparatus comprising:
  a conveyance roller configured to convey a laminate made by peelably laminating a first substrate and a second substrate including a first area, a second area, and an opening being formed by the first area and the second area, the first area being provided on both sides of the opening in a winding direction of the second substrate, the second area being provided on both sides of the opening in a direction intersecting the winding direction of the second substrate;
  a peel roller arranged facing the conveyance roller with the laminate interposed in between, and configured to peel the second substrate from the laminate;
  a winding roller arranged away from the conveyance roller, and configured to wind the second substrate; and
  an auxiliary winding roller arranged between the peel roller and the winding roller, and including:
    a roller main body; and
    a stepped portion comprising a projection portion and configured to guide the first area or the second area,
  wherein;
  the projection portion protrudes from a circumferential surface of the roller main body so that the projection portion is inserted into the opening,
  when the winding roller winds the second substrate, the second substrate is wound around the winding roller in a condition in which:
    the projection portion of the stepped portion of the auxiliary winding roller is inserted into the opening and the first area is guided to contact the projection portion of the stepped portion of the auxiliary winding roller; and
    the stepped portion of the auxiliary winding roller comprises the projection portion projecting into the opening and contacting the first area, and the projection portion is movable along a direction of an axis of rotation of the auxiliary winding roller in which the auxiliary winding roller extends.

2. The peeling apparatus according to claim 1, wherein the projection portion of the stepped portion comprises:
   a first projection portion configured to guide the first area on one of the sides of the opening, and
   a second projection portion arranged away from the first projection portion and configured to guide the first area on the other one of the sides of the opening.

3. The peeling apparatus according to claim 1, wherein the auxiliary winding roller is biased against the second substrate.

4. The peeling apparatus according to claim 1, wherein with an increase in a winding diameter of the second substrate wound by the winding roller, the auxiliary winding roller is movable in a direction away from the winding roller.

5. The peeling apparatus according to claim 1, wherein
   the laminate includes a release substrate, and a seal substrate peelably bonded to one surface of the release substrate,
   the seal substrate includes a label portion including a predetermined pattern shape, and a non-label portion including the opening at the label portion,
   the first substrate comprises the release substrate and the label portion, and
   the second substrate comprises the non-label portion.

6. The peeling apparatus according to claim 1, wherein
   the roller main body has a first diameter, and
   the stepped portion has a second diameter larger than the first diameter of the roller main body and is configured to be inserted into the opening of the second substrate.

7. The peeling apparatus according to claim 1, wherein the projection portion comprises an end portion, and an outer diameter of the end portion becomes smaller outward.

8. A peeling apparatus comprising:
   a conveyance roller configured to convey a laminate made by peelably laminating a first substrate and a second substrate including a first area, a second area, and an opening being formed by the first area and the second area, the first area being provided on both sides of the opening in a winding direction of the second substrate, the second area being provided on both sides of the opening in a direction intersecting the winding direction of the second substrate;
   a peel roller arranged facing the conveyance roller with the laminate interposed in between, and configured to peel the second substrate from the laminate;
   a winding roller arranged away from the conveyance roller, and configured to wind the second substrate; and
   an auxiliary winding roller arranged between the peel roller and the winding roller, and including:
      a roller main body; and
      a stepped portion comprising a recess portion and configured to guide the first area or the second area,
   wherein
   the recess portion recesses from a circumferential surface of the roller main body so that the first area or the second area fits into the recess portion,
   when the winding roller winds the second substrate, the second substrate is wound around the winding roller in a condition in which the first area or the second area of the second substrate is guided to be fit into the recess portion of the stepped portion of the auxiliary winding roller, and
   a position of the recess portion along the direction of an axis of rotation of the auxiliary winding roller in which the auxiliary winding roller extends is changeable in response to a presence or absence of the first area or the second area against the circumferential surface of the auxiliary winding roller.

* * * * *